(12) United States Patent
Ratnayake et al.

(10) Patent No.: US 12,068,602 B2
(45) Date of Patent: Aug. 20, 2024

(54) ADVANCED POWER DISTRIBUTION PLATFORM

(71) Applicant: Duke Energy Corporation, Charlotte, NC (US)

(72) Inventors: W R M Anuja Ratnayake, Charlotte, NC (US); Daniel Woodall, Raleigh, NC (US); Andrew Kling, Charlotte, NC (US); Gerard Rendell, Charlotte, NC (US); Jacob A. Richardson, Charlotte, NC (US); Miguel Armando Sanda, Indian Land, SC (US); Jose Martin Cardenas, Charlotte, NC (US); John Templeton Pressley, Charlotte, NC (US); Rakesh Kumar Belchandan, Charlotte, NC (US)

(73) Assignee: Duke Energy Corporation, Charlotte, NC (US)

( * ) Notice: Subject to any disclaimer, the term of this patent is extended or adjusted under 35 U.S.C. 154(b) by 426 days.

(21) Appl. No.: 17/427,285

(22) PCT Filed: Jan. 31, 2020

(86) PCT No.: PCT/US2020/016142
§ 371 (c)(1),
(2) Date: Jul. 30, 2021

(87) PCT Pub. No.: WO2020/160427
PCT Pub. Date: Aug. 6, 2020

(65) Prior Publication Data
US 2022/0115867 A1 Apr. 14, 2022

Related U.S. Application Data

(60) Provisional application No. 62/800,122, filed on Feb. 1, 2019.

(51) Int. Cl.
*H02J 3/00* (2006.01)
*G05B 19/042* (2006.01)
*H02J 3/06* (2006.01)

(52) U.S. Cl.
CPC .......... *H02J 3/0012* (2020.01); *G05B 19/042* (2013.01); *H02J 3/06* (2013.01);
(Continued)

(58) Field of Classification Search
None
See application file for complete search history.

(56) References Cited

U.S. PATENT DOCUMENTS 9,003,216 B2  4/2015  Sankar et al.
9,553,455 B2  1/2017  Horsfield
(Continued)

FOREIGN PATENT DOCUMENTS

WO  2018156700 A1  8/2018

OTHER PUBLICATIONS

Farag, Hany E., Ehab F. El-Saadany, and Ravi Seethapathy. "A two ways communication-based distributed control for voltage regulation in smart distribution feeders." IEEE Transactions on Smart Grid 3.1 (2011): 271-281. (Year: 2011).*

(Continued)

*Primary Examiner* — Carlos R Ortiz Rodriguez
(74) *Attorney, Agent, or Firm* — Myers Bigel, P.A.

(57) ABSTRACT

A control system for a power distribution grid including an electrical distribution circuit includes a processor configured to perform operations including constructing a grid model comprising edges and nodes representing assets and transmission paths of the power distribution grid, generating an analysis of an operation of the power distribution grid over a predetermined time duration, determining a plurality of constraint violations based on the analysis of the operation (Continued)

of the power distribution grid within the predetermined time duration, generating a plurality of alterations to the power distribution grid, respective ones of the plurality of alterations resolving at least one of the constraint violations, selecting a first alteration of the plurality of alterations to the power distribution grid responsive to determining that the selected first alteration resolves at least two of the plurality of constraint violations, and autonomously implementing the first alteration to the power distribution grid.

36 Claims, 22 Drawing Sheets

(52) U.S. Cl.
CPC ... *G05B 2219/2639* (2013.01); *H02J 2203/10* (2020.01); *H02J 2203/20* (2020.01); *H02J 2300/22* (2020.01)

(56) References Cited

U.S. PATENT DOCUMENTS

| | | | |
|---|---|---|---|
| 9,703,308 | B2 | 7/2017 | Claessens et al. |
| 10,063,052 | B2 | 8/2018 | Weckx et al. |
| 2017/0237260 | A1 | 8/2017 | Rhie et al. |
| 2017/0373535 | A1 | 12/2017 | Dam |

OTHER PUBLICATIONS

Yorino, Naoto, et al. "An optimal autonomous decentralized control method for voltage control devices by using a multi-agent system." IEEE Transactions on Power Systems 30.5 (2014): 2225-2233. (Year: 2014).*

Chanda, Sayonsom, and Anurag K. Srivastava. "Defining and enabling resiliency of electric distribution systems with multiple microgrids." IEEE Transactions on Smart Grid 7.6 (2016): 2859-2868. (Year: 2016).*

Cintuglu, Mehmet H., Tarek Youssef, and Osama A. Mohammed. "Development and application of a real-time testbed for multiagent system interoperability: A case study on hierarchical microgrid control." IEEE Transactions on Smart Grid 9.3 (2016): 1759-1768. (Year: 2016).*

Zadsar, Masoud, Mahmoud Reza Haghifam, and Sayyed Majid Miri Larimi. "Approach for self-healing resilient operation of active distribution network with microgrid." IET Generation, Transmission & Distribution 11.18 (2017): 4633-4643. (Year: 2017).*

Bhattarai, Bishnu P., et al. "Smart grid constraint violation management for balancing and regulating purposes." IEEE Transactions on Industrial Informatics 13.6 (2017): 2864-2875. (Year: 2017).*

Starke, Michael, et al. "Implementation of a publish-subscribe protocol in microgrid islanding and resynchronization with self-discovery." IEEE Transactions on Smart Grid 10.1 (2017): 361-370. (Year: 2017).*

Georgilakis et al., "A Review of Power Distribution Planning in the Modern Power Systems Era: Models, Methods and Future Research", Electric Power Systems Research, 121, (2015), pp. 89-100.

Li et al., "A Review of Optimal Planning Active Distribution System: Models, Methods, and Future Researches", Energies 2017, 10, 1715 (27 pages).

PCT Notification of Transmittal of the International Search Report and the Written Opinion of the International Searching Authority, or the Declaration, mailed Apr. 24, 2020, for corresponding PCT International Application No. PCT/US2020/016142.

Sahoo et al., "Load Frequency Control of Interconnected Power Systems by Considering Self-Component of Area Control Error", National Power Systems Conference, NPSC, 2004, p. 966-971.

Li, Rui , et al., "A Review of Optimal Planning Active Distribution System: Models, Methods, and Future Researches", Energies, vol. 10, Issue 11, 1715, Nov. 2017, 27 pp.

* cited by examiner

| | ASSET CLASS | SUMMER CONSTRAINT | WINTER CONSTRAINT | PEAK ANTICIPATED LOADING (SUMMER) | VIOLATION TIME PROFILE | CONSTRAINT VIOLATION |
|---|---|---|---|---|---|---|
| 1 | SUBSTATION TRANSFORMER | THERMAL CAPACITY: 1200 A | THERMAL CAPACITY: 1200 A | Y1: 1100 A<br>Y5: 1300 A<br>Y10: 1500 A | Y1: NA<br>Y5: 4 HOUR SUMMER<br>Y10: 6 HOUR SUMMER | THERMAL OVERLOAD OF SUBSTATION TRANSFORMER |
| 2 | CONDUCTOR | THERMAL CAPACITY: 400 A | THERMAL CAPACITY: 480 A | Y1: 350 A<br>Y5: 400 A<br>Y10: 450 A | Y1: NA<br>Y5: 1 HOUR SUMMER<br>Y10: 2 HOUR SUMMER | THERMAL OVERLOAD OF CONDUCTOR |
| 3 | CONDUCTOR | THERMAL CAPACITY: 400 A | THERMAL CAPACITY: 480 A | Y1: 350 A<br>Y5: 400 A<br>Y10: 450 A | Y1: NA<br>Y5: 1 HOUR SUMMER<br>Y10: 2 HOUR SUMMER | THERMAL OVERLOAD OF CONDUCTOR |
| 4 | CONDUCTOR | THERMAL CAPACITY: 400 A | THERMAL CAPACITY: 480 A | Y1: 350 A<br>Y5: 400 A<br>Y10: 450 A | Y1: NA<br>Y5: 1 HOUR SUMMER<br>Y10: 2 HOUR SUMMER | THERMAL OVERLOAD OF CONDUCTOR |
| 5 | CONDUCTOR | THERMAL CAPACITY: 400 A | THERMAL CAPACITY: 480 A | Y1: 350 A<br>Y5: 400 A<br>Y10: 450 A | Y1: NA<br>Y5: 1 HOUR SUMMER<br>Y10: 2 HOUR SUMMER | THERMAL OVERLOAD OF CONDUCTOR |

FIG. 7A

| VIOLATION GROUP | ASSETS | SPATIAL MAPPING | TEMPORAL MAPPING |
|---|---|---|---|
| A | [SUBSTATION TRANSFORMER] | NA | SUMMER PEAK 6 HOUR YEAR 10 |
| B | [CONDUCTOR] | NA | SUMMER PEAK 2 HOUR YEAR 10 |
| C | [SUBSTATION TRANSFORMER, CONDUCTOR] | CONDUCTOR ON CIRCUIT CONNECTED TO SUBSTATION TRANSFORMER | SUMMER PEAK 6 HOUR YEAR 10 |

| | SOLUTION | SOLUTION DESCRIPTION | ASSET CLASS | MINIMUM TIME TO IMPLEMENT | COST MULTIPLIER OVER 40 YEARS | RELIABILITY | RESILIENCY | ENVIRONMENTAL IMPACT | POWER FACTOR OPTIMIZATION | LOSS MINIMIZATION | MARKET OPPORTUNITY | PUBLIC RELATIONS |
|---|---|---|---|---|---|---|---|---|---|---|---|---|
| 1 | NEW SUBSTATION | BUILD A NEW SUBSTATION TO ACCOMMODATE LOAD GROWTH OR (INCREASE RELIABILITY?) | SUBSTATION | 5 YEAR FROM SCRATCH | 1 | 1 | 3 | 4 | 1 | 1 | 3 | 4 |
| 2 | NEW SUBSTATION TRANSFORMER | ADD A NEW SUBSTATION TRANSFORMER TO AN EXISTING SUBSTATION | SUBSTATION TRANSFORMER | 1 YEAR | 1 | 1 | 3 | 3 | 1 | 1 | 3 | 1 |
| 3 | CONVERT VOLTAGE TO HIGHER VOLTAGE | CONVERT EXISTING SUBSTATION TRANSFORMER AND ASSOCIATED DISTRIBUTION CIRCUITS TO HIGHER VOLTAGE (4kv -> 12.47 -> 24kV) | SUBSTATION TRANSFORMER, DISTRIBUTION CIRCUIT | 6 MONTHS | 1 | 5 | 5 | 4 | 3 | 3 | 5 | 3 |
| 4 | NEW CIRCUIT | ADD A NEW CIRCUIT TO AN EXISTING SUBSTATION WITH EXISTING CAPACITY ON SUBSTATION TRANSFORMER. 556 BACKBONE DEC/ 477 DEP FOR BACKBONE, AND 1/0 FOR TAPS | DISTRIBUTION CIRCUIT | 1 YEAR | 1 | 3 | 3 | 4 | 3 | 4 | 5 | 4 |
| 5 | ADD SUBSTATION CAPACITORS | INSTALL CAPACITORS INSIDE SUBSTATION FENCE TO DECREASE VAR IMPORT FROM TRANSMISSION (IMPROVE SUBSTATION POWER FACTOR) | SUBSTATION CAPACITOR | 1 YEAR | 1 | 5 | 5 | 3 | 1 | 2 | 5 | 1 |
| 6 | ASSET MANAGEMENT TRANSFORMER ADDITION | INSTALL ADDITIONAL TRANSFORMER INSIDE OF SUBSTATION NO FOR LOAD BUT FOR INCREASED RELIABILITY | SUBSTATION TRANSFORMER | 1 YEAR | 1 | 1 | 3 | 4 | 3 | 4 | 5 | 1 |

| | VIOLATION GROUP | VIOLATION ASSETS | SPATIAL MAPPING | TEMPORAL MAPPING | SOLUTION | MAX TIME TO IMPLEMENT | SOLUTION GROUP 1 | SOLUTION GROUP 2 | SOLUTION GROUP 3 | SOLUTION GROUP 4 | SOLUTION GROUP 5 | SOLUTION GROUP 6 |
|---|---|---|---|---|---|---|---|---|---|---|---|---|
| 1 | A | [SUBSTATION TRANSFORMER] | NA | SUMMER PEAK, 6 HOUR YEAR 10 | NEW SUBSTATION TRANSFORMER | 5 YEARS | X | X | | | | |
| 2 | A | [SUBSTATION TRANSFORMER] | NA | SUMMER PEAK, 6 HOUR YEAR 10 | DISTRIBUTION ENERGY STORAGE (2 MW 6 MWH) | 5 YEARS | | | X | X | | |
| 3 | B | [CONDUCTOR] | NA | SUMMER PEAK, 2 HOUR YEAR 10 | RECONDUCTOR | 5 YEARS | X | X | X | | | |
| 4 | B | [CONDUCTOR] | NA | SUMMER PEAK, 2 HOUR YEAR 10 | DISTRIBUTION ENERGY STORAGE (1 MW 2 MWH) | 5 YEARS | | | | X | | |
| 5 | C | [SUBSTATION TRANSFORMER, CONDUCTOR] | CONDUCTOR ON CIRCUIT CONNECTED TO SUBSTATION TRANSFORMER | SUMMER PEAK, 6 HOUR YEAR 10 | DISTRIBUTION ENERGY STORAGE (2 MW 8 MWH) | 5 YEARS | | | | | X | |
| 6 | C | [SUBSTATION TRANSFORMER, CONDUCTOR] | CONDUCTOR ON CIRCUIT CONNECTED TO SUBSTATION TRANSFORMER | SUMMER PEAK, 6 HOUR YEAR 10 | TRANSFER TAPS, DEMAND RESPONSE, DISTRIBUTION ENERGY STORAGE (1 MW 6 MWH) | 5 YEARS | | | | | | X |

| SOURCE $Y_{PRIMITIVE}$ | | | | | | | | |
|---|---|---|---|---|---|---|---|---|
| | NODEA | | | | GND | | | |
| NODEA | SR.11 | SR.12 | SR.13 | SR.14 | SR.15 | SR.16 | SR.17 | SR.18 |
| | SR.21 | SR.22 | SR.23 | SR.24 | SR.25 | SR.26 | SR.27 | SR.28 |
| | SR.31 | SR.32 | SR.33 | SR.34 | SR.35 | SR.36 | SR.37 | SR.38 |
| | SR.41 | SR.42 | SR.43 | SR.44 | SR.45 | SR.46 | SR.47 | SR.48 |
| GND | SR.51 | SR.52 | SR.53 | SR.54 | SR.55 | SR.56 | SR.57 | SR.58 |
| | SR.61 | SR.62 | SR.63 | SR.64 | SR.65 | SR.66 | SR.67 | SR.68 |
| | SR.71 | SR.72 | SR.73 | SR.74 | SR.75 | SR.76 | SR.77 | SR.78 |
| | SR.81 | SR.82 | SR.83 | SR.84 | SR.85 | SR.86 | SR.87 | SR.88 |

Corners labeled $A_{SR}$, $B_{SR}$, $C_{SR}$, $D_{SR}$.

FIG. 11B

| TRANSFORMER $Y_{PRIMITIVE}$ | | | | | | | | |
|---|---|---|---|---|---|---|---|---|
| | NODEA | | | | NODEB | | | |
| NODEA | TR.11 | TR.12 | TR.13 | TR.14 | TR.15 | TR.16 | TR.17 | TR.18 |
| | TR.21 | TR.22 | TR.23 | TR.24 | TR.25 | TR.26 | TR.27 | TR.28 |
| | TR.31 | TR.32 | TR.33 | TR.34 | TR.35 | TR.36 | TR.37 | TR.38 |
| | TR.41 | TR.42 | TR.43 | TR.44 | TR.45 | TR.46 | TR.47 | TR.48 |
| NODEB | TR.51 | TR.52 | TR.53 | TR.54 | TR.55 | TR.56 | TR.57 | TR.58 |
| | TR.61 | TR.62 | TR.63 | TR.64 | TR.65 | TR.66 | TR.67 | TR.68 |
| | TR.71 | TR.72 | TR.73 | TR.74 | TR.75 | TR.76 | TR.77 | TR.78 |
| | TR.81 | TR.82 | TR.83 | TR.84 | TR.85 | TR.86 | TR.87 | TR.88 |

Corners labeled $A_{TR}$, $B_{TR}$, $C_{TR}$, $D_{TR}$.

$A_L$ $B_L$

| LINE Y$_{PRIMITIVE}$ | | | | | | | |
|---|---|---|---|---|---|---|---|
| | NODEB | | | | NODEC | | |
| NODEB | L.11 | L.12 | L.13 | L.14 | L.15 | L.16 | L.17 | L.18 |
| | L.21 | L.22 | L.23 | L.24 | L.25 | L.26 | L.27 | L.28 |
| | L.31 | L.32 | L.33 | L.34 | L.35 | L.36 | L.37 | L.38 |
| | L.41 | L.42 | L.43 | L.44 | L.45 | L.46 | L.47 | L.48 |
| NODEC | L.51 | L.52 | L.53 | L.54 | L.55 | L.56 | L.57 | L.58 |
| | L.61 | L.62 | L.63 | L.64 | L.65 | L.66 | L.67 | L.68 |
| | L.71 | L.72 | L.73 | L.74 | L.75 | L.76 | L.77 | L.78 |
| | L.81 | L.82 | L.83 | L.84 | L.85 | L.86 | L.87 | L.88 |

| LOAD Y$_{PRIMITIVE}$ | | | | | | | |
|---|---|---|---|---|---|---|---|
| | NODEC | | | | GND | | |
| NODEC | LO.11 | LO.12 | LO.13 | LO14 | LO.15 | LO.16 | LO.17 | LO.18 |
| | LO.21 | LO.22 | LO.23 | LO.24 | LO.25 | LO.26 | LO.27 | LO.28 |
| | LO.31 | LO.32 | LO.33 | LO.34 | LO.35 | LO.36 | LO.37 | LO.38 |
| | LO.41 | LO.42 | LO.43 | LO.44 | LO.45 | LO.46 | LO.47 | LO.48 |
| GND | LO.51 | LO.52 | LO.53 | LO.54 | LO.55 | LO.56 | LO.57 | LO.58 |
| | LO.61 | LO.62 | LO.63 | LO.64 | LO.65 | LO.66 | LO.67 | LO.68 |
| | LO.71 | LO.72 | LO.73 | LO.74 | LO.75 | LO.76 | LO.77 | LO.78 |
| | LO.81 | LO.82 | LO.83 | LO.84 | LO.85 | LO.86 | LO.87 | LO.88 |

|  | NODEB | | | |
|---|---|---|---|---|
| NODEB | TR.55+L.11 | TR.56+L.12 | TR.57+L.13 | TR.58+L.14 |
| | TR.65+L.21 | TR.66+L.22 | TR.67+L.23 | TR.68+L.24 |
| | TR.75+L.31 | TR.76+L.32 | TR.77+L.33 | TR.78+L.34 |
| | TR.85+L.41 | TR.86+L.42 | TR.87+L.43 | TR.88+L.44 |

FIG. 12A

| $Y_{SYSTEM}$ | | NODEA | | | | NODEB | | | | NODEC | | | |
|---|---|---|---|---|---|---|---|---|---|---|---|---|---|
| | | SR.11+TR.11 | SR.12+TR.12 | SR.13+TR.13 | SR.14+TR.14 | TR.15 | TR.16 | TR.17 | TR.18 | 0 | 0 | 0 | 0 |
| NODEA | | SR.21+TR.21 | SR.22+TR.22 | SR.23+TR.23 | SR.24+TR.24 | TR.25 | TR.26 | TR.27 | TR.28 | 0 | 0 | 0 | 0 |
| | | SR.31+TR.31 | SR.32+TR.32 | SR.33+TR.33 | SR.34+TR.34 | TR.35 | TR.36 | TR.37 | TR.38 | 0 | 0 | 0 | 0 |
| | | SR.41+TR.41 | SR.42+TR.42 | SR.43+TR.43 | SR.44+TR.44 | TR.45 | TR.46 | TR.47 | TR.48 | 0 | 0 | 0 | 0 |
| NODEB | | TR.51 | TR.52 | TR.53 | TR.54 | TR.55+L.11 | TR.56+L.12 | TR.57+L.13 | TR.58+L.14 | L.15 | L.16 | L.17 | L.18 |
| | | TR.61 | TR.62 | TR.63 | TR.64 | TR.65+L.21 | TR.66+L.22 | TR.67+L.23 | TR.68+L.24 | L.25 | L.26 | L.27 | L.28 |
| | | TR.71 | TR.72 | TR.73 | TR.74 | TR.75+L.31 | TR.76+L.32 | TR.77+L.33 | TR.78+L.34 | L.35 | L.36 | L.37 | L.38 |
| | | TR.81 | TR.82 | TR.83 | TR.84 | TR.85+L.41 | TR.86+L.42 | TR.87+L.43 | TR.88+L.44 | L.45 | L.46 | L.47 | L.48 |
| NODEC | | 0 | 0 | 0 | 0 | L.51 | L.52 | L.53 | L.54 | L.55+L0.11 | L.56+L0.12 | L.57+L0.13 | L.58+L0.14 |
| | | 0 | 0 | 0 | 0 | L.61 | L.62 | L.63 | L.64 | L.65+L0.21 | L.66+L0.22 | L.67+L0.23 | L.68+L0.24 |
| | | 0 | 0 | 0 | 0 | L.71 | L.72 | L.73 | L.74 | L.75+L0.31 | L.76+L0.32 | L.77+L0.33 | L.78+L0.34 |
| | | 0 | 0 | 0 | 0 | L.81 | L.82 | L.83 | L.84 | L.85+L0.41 | L.86+L0.42 | L.87+L0.43 | L.88+L0.44 |

FIG. 12B

FIG. 17A
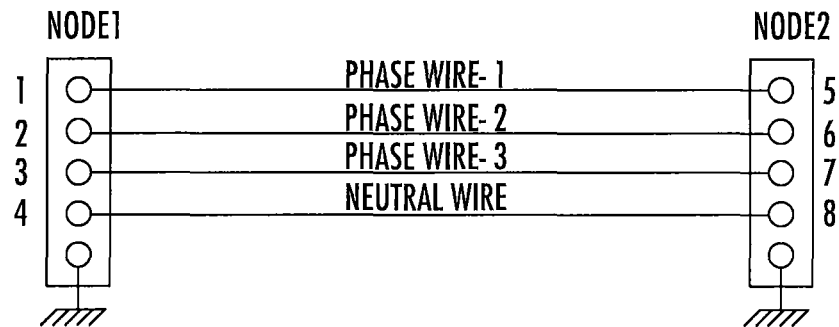
FIG. 17B
$Y_{PRIMITIVE}=$
|  | NODE1 | NODE2 |
|---|---|---|
| NODE1 | $Y_{11}\ Y_{12}\ Y_{13}\ Y_{14}$<br>$Y_{21}\ Y_{22}\ Y_{23}\ Y_{24}$<br>$Y_{31}\ Y_{32}\ Y_{33}\ Y_{34}$<br>$Y_{41}\ Y_{42}\ Y_{43}\ Y_{44}$ | $Y_{15}\ Y_{16}\ Y_{17}\ Y_{18}$<br>$Y_{25}\ Y_{26}\ Y_{27}\ Y_{28}$<br>$Y_{35}\ Y_{36}\ Y_{37}\ Y_{38}$<br>$Y_{45}\ Y_{46}\ Y_{47}\ Y_{48}$ |
| NODE2 | $Y_{51}\ Y_{52}\ Y_{53}\ Y_{54}$<br>$Y_{61}\ Y_{62}\ Y_{63}\ Y_{64}$<br>$Y_{71}\ Y_{72}\ Y_{73}\ Y_{74}$<br>$Y_{81}\ Y_{82}\ Y_{83}\ Y_{84}$ | $Y_{55}\ Y_{56}\ Y_{57}\ Y_{58}$<br>$Y_{65}\ Y_{66}\ Y_{67}\ Y_{68}$<br>$Y_{75}\ Y_{76}\ Y_{77}\ Y_{78}$<br>$Y_{85}\ Y_{86}\ Y_{87}\ Y_{88}$ |
FIG. 17C

ADVANCED POWER DISTRIBUTION PLATFORM

CROSS REFERENCE TO RELATED APPLICATIONS

This application is a 35 U.S.C. § 371 national stage application of PCT International Application No. PCT/US2020/016142, filed on Jan. 31, 2020, which claims priority from U.S. Provisional Patent Application No. 62/800,122, filed on Feb. 1, 2019, the contents of each of which are incorporated herein by reference in their entireties. The above-referenced PCT International Application was published in the English language as International Publication No. WO 2020/160427 A1 on Aug. 6, 2020.

BACKGROUND

The present disclosure relates in general to the field of electrical power distribution, and more specifically, to systems configured to manage and provide modifications to electrical power distribution grids.

Modern power distribution grids include many generation and transmission resources used to provide power to different types of user loads. Generation and transmission resources may include generators, transmission lines, substations, transformers, etc.

FIG. 1 is a simplified block diagram illustrating an example electrical power distribution environment. Referring to FIG. 1, electric power may be generated at a power generation facility 110 for distribution to users 120 that consume the generated electric power. Examples of power generation facilities 110 include facilities which generate electricity from fossil fuels (e.g., coal, petroleum, and/or natural gas), solar thermal energy, geothermal energy, nuclear energy, potential energy (e.g., with a hydroelectric facility), wind energy, and/or chemical energy.

Once generated at the power generation facility 110, the electricity may be delivered to the users 120 via a power distribution grid. The power grid may include, for example, power transmission lines 115 between the power generation facility 110 and one or more substations 140. The electricity may be further transmitted from the substation 140 to one or more users 120 over electrical distribution circuits 130, also known as feeders. For example, the electrical distribution circuit 130 may provide electricity to a user 120 via a connection between the electrical distribution circuit 130 and the location (e.g., house or building) of the user 120, such as, for example, at a power meter. The electrical distribution circuits 130 may include, for example, both overhead and underground power lines. Electrical distribution circuits 130 may include additional segmentation. For example, an electrical distribution circuit 130 may include one or more protective devices 135. Protective devices 135 may include, for example, switches, circuit breakers, and/or reclosers. An electrical distribution segment 137 may include portions of an electrical distribution circuit 130 that are disposed between two protective devices 135.

A power distribution grid may further include a distributed energy resource (DER). DERs include physical and virtual assets that can be arranged within the power distribution grid. In some embodiments, the DER may be located close to a load in the power distribution grid, and may be located behind a customer meter. DER systems may use renewable energy sources, including small hydro, biomass, biogas, solar power, wind power, and geothermal power, and increasingly play an important role for the electric power distribution system. DERs can be used to provide additional resources to the power distribution grid, individual customers, or both. DERs can include Distributed Generation (DG) systems, which include technology that produces power outside of the utility grid (e.g., fuel cells, microturbines, and photovoltaics), and energy storage systems (ESS), which include technology that produces power or stores power (e.g., batteries and flywheels).

DERs may be inherently uncertain (intermittent and unpredictable). Deterministic methods of multi-objective criteria planning algorithms used in conventional distribution planning have been found to have difficulty with planning and allocation problems when hundreds of thousands of DERs are added. This lack of convergence may lead to emergent conditions, unnecessary distribution grid hardening, network losses, and unattainable development and environmental targets. DERs are also being integrated and actively controlled and coordinated to improve the utilization of other DERs within the power distribution grid, which may compound the operational and planning problems.

Similar problems may occur with the large scale integration of DG systems into the power distribution grid. When ESSs are added at scale into the mix for distribution planning, the problems may become more complicated.

Therefore, conventional distribution planning methods have become barriers to improving the penetration of DERs, which has led to the realization that power distribution systems need different solutions.

SUMMARY

Pursuant to some embodiments of the present invention, a control system for a power distribution grid includes a processor; a memory coupled to the processor and comprising computer readable program code that when executed by the processor causes the processor to perform operations comprising: constructing a grid model comprising edges and nodes representing assets and transmission paths of the power distribution grid; generating an analysis of an operation of the power distribution grid over a predetermined time duration; determining a plurality of constraint violations based on the analysis of the operation of the power distribution grid within the predetermined time duration; generating a plurality of alterations to the power distribution grid, respective ones of the plurality of alterations resolving at least one of the constraint violations; selecting a first alteration of the plurality of alterations to the power distribution grid responsive to determining that the selected first alteration resolves at least one of the plurality of constraint violations; and autonomously implementing the first alteration to the power distribution grid In some embodiments, wherein autonomously implementing the first alteration to the power distribution grid comprises automatically switching an equipment of the power distribution grid from a first portion of the power distribution grid to a second portion of the power distribution grid.

In some embodiments, autonomously implementing the first alteration to the power distribution grid comprises transmitting a communication within the power distribution grid to activate at least one of a solar power system, an energy storage system, and a demand response mechanism at a load of the power distribution grid.

In some embodiments, transmitting the communication comprises transmitting a transmission over an Open Field Message Bus.

In some embodiments, the demand response mechanism is configured to dynamically throttle the load.

In some embodiments, generating a plurality of alterations to the power distribution grid is performed by an asset of the power distribution grid.

In some embodiments, generating the plurality of alterations to the power distribution grid comprises generating the first alteration of the plurality of alterations at a first asset of the power distribution grid and a second alteration of the plurality of alterations at a second asset of the power distribution grid.

In some embodiments, generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

In some embodiments, selecting the first alteration of the plurality of alterations to the power distribution grid comprises: updating the grid model with the first alteration to form an updated grid model; generating a second analysis of a second operation of the updated grid model; validating that the first alteration resolves the at least one of the constraint violations based on the second analysis; and computing a solution score for the first alteration.

In some embodiments, selecting the first alteration of the plurality of alterations to the power distribution grid is responsive to determining that the selected first alteration resolves two or more of the plurality of constraint violations.

In some embodiments, the control system comprises a first agent node appliance in a first subset of the power distribution grid and a second agent node appliance in a second subset of the power distribution grid, and generating the analysis of the operation of the power distribution grid over the predetermined time duration comprises the first agent node appliance generating a first analysis of the first subset of the power distribution grid; and the second agent node appliance generating a second analysis of the second subset of the power distribution grid based on the first analysis.

In some embodiments, the first agent node appliance is configured to generate the first analysis of the first subset based on sensor data retrieved by the first agent node appliance.

In some embodiments, generating the plurality of alterations to the power distribution grid comprises altering a discharging cycle of an energy storage system coupled to the power distribution grid.

Pursuant to some embodiments of the present invention, a method of operating a power distribution grid includes: constructing a grid model comprising edges and nodes representing assets and transmission paths of the power distribution grid; generating an analysis of an operation of the power distribution grid over a predetermined time duration; determining a plurality of constraint violations based on the analysis of the operation of the power distribution grid within the predetermined time duration; generating a plurality of alterations to the power distribution grid, respective ones of the plurality of alterations resolving at least one of the constraint violations; selecting a first alteration of the plurality of alterations to the power distribution grid responsive to determining that the selected first alteration resolves at least two of the plurality of constraint violations; and autonomously implementing the first alteration to the power distribution grid.

In some embodiments, autonomously implementing the first alteration to the power distribution grid comprises automatically switching an equipment of the power distribution grid from a first portion of the power distribution grid to a second portion of the power distribution grid.

In some embodiments, autonomously implementing the first alteration to the power distribution grid comprises transmitting a communication within the power distribution grid to activate at least one of a solar power system, an energy storage system, and a demand response mechanism at a load of the power distribution grid.

In some embodiments, transmitting the communication comprises transmitting a transmission over an Open Field Message Bus.

In some embodiments, the demand response mechanism is configured to dynamically throttle the load.

In some embodiments, generating a plurality of alterations to the power distribution grid is performed by an asset of the power distribution grid.

In some embodiments, generating the plurality of alterations to the power distribution grid comprises generating the first alteration of the plurality of alterations at a first asset of the power distribution grid and a second alteration of the plurality of alterations at a second asset of the power distribution grid.

In some embodiments, generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

In some embodiments, selecting the first alteration of the plurality of alterations to the power distribution grid comprises: updating the grid model with the first alteration to form an updated grid model; generating a second analysis of a second operation of the updated grid model; validating that the first alteration resolves the at least one of the constraint violations based on the second analysis; and computing a solution score for the first alteration.

In some embodiments, selecting the first alteration of the plurality of alterations to the power distribution grid is responsive to determining that the selected first alteration resolves two or more of the plurality of constraint violations.

Pursuant to some embodiments of the present invention, a computer program product includes: a tangible non-transitory computer readable storage medium comprising computer readable program code embodied in the computer readable storage medium that when executed by at least one processor causes the at least one processor to perform operations comprising: constructing a grid model comprising edges and nodes representing assets and transmission paths of the power distribution grid; generating an analysis of an operation of the power distribution grid over a predetermined time duration; determining a plurality of constraint violations resulting based on the analysis of the operation of the power distribution grid within the predetermined time duration; generating a plurality of alterations to the power distribution grid, respective ones of the plurality of alterations resolving at least one of the constraint violations; selecting a first alteration of the plurality of alterations to the power distribution grid responsive to determining that the selected first alteration resolves at least two of the plurality of constraint violations; and autonomously implementing the first alteration to the power distribution grid.

In some embodiments, autonomously implementing the first alteration to the power distribution grid comprises automatically switching an equipment of the power distribution grid from a first portion of the power distribution grid to a second portion of the power distribution grid.

In some embodiments, autonomously implementing the first alteration to the power distribution grid comprises transmitting a communication within the power distribution grid to activate at least one of a solar power system, an energy storage system, and a demand response mechanism at a load of the power distribution grid.

In some embodiments, wherein transmitting the communication comprises transmitting a transmission over an Open Field Message Bus In some embodiments, the demand response mechanism is configured to dynamically throttle the load.

In some embodiments, generating a plurality of alterations to the power distribution grid is performed by an asset of the power distribution grid.

In some embodiments, generating the plurality of alterations to the power distribution grid comprises generating the first alteration of the plurality of alterations at a first asset of the power distribution grid and a second alteration of the plurality of alterations at a second asset of the power distribution grid.

In some embodiments, generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

In some embodiments, selecting the first alteration of the plurality of alterations to the power distribution grid comprises: updating the grid model with the first alteration to form an updated grid model; generating a second analysis of a second operation of the updated grid model; validating that the first alteration resolves the at least one of the constraint violations based on the second analysis; and computing a solution score for the first alteration.

In some embodiments, selecting the first alteration of the plurality of alterations to the power distribution grid is responsive to determining that the selected first alteration resolves two or more of the plurality of constraint violations.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below

BRIEF DESCRIPTION OF THE DRAWINGS

Features of embodiments of the present disclosure will be more readily understood from the following detailed description of specific embodiments thereof when read in conjunction with the accompanying drawings, in which:

FIG. 7A illustrates an example of a constraint violation list according to embodiments described herein;

FIG. 7B illustrates a set of grouped violations according to embodiments described herein;

FIG. 8 illustrates an example of solutions that may be available to be applied to the power distribution grid; and FIG. 9 illustrates an example list of potential solutions for the constraint violations of the constraint violation groups illustrated in FIG. 7B.

FIGS. 10 to 13 illustrate example embodiments of the formulation of a power distribution graph, according to embodiments described herein.

FIGS. 17A to 17C illustrate schematic elements related to the calculation of Y primitives, according to some embodiments described herein.

DETAILED DESCRIPTION

Figure 1:
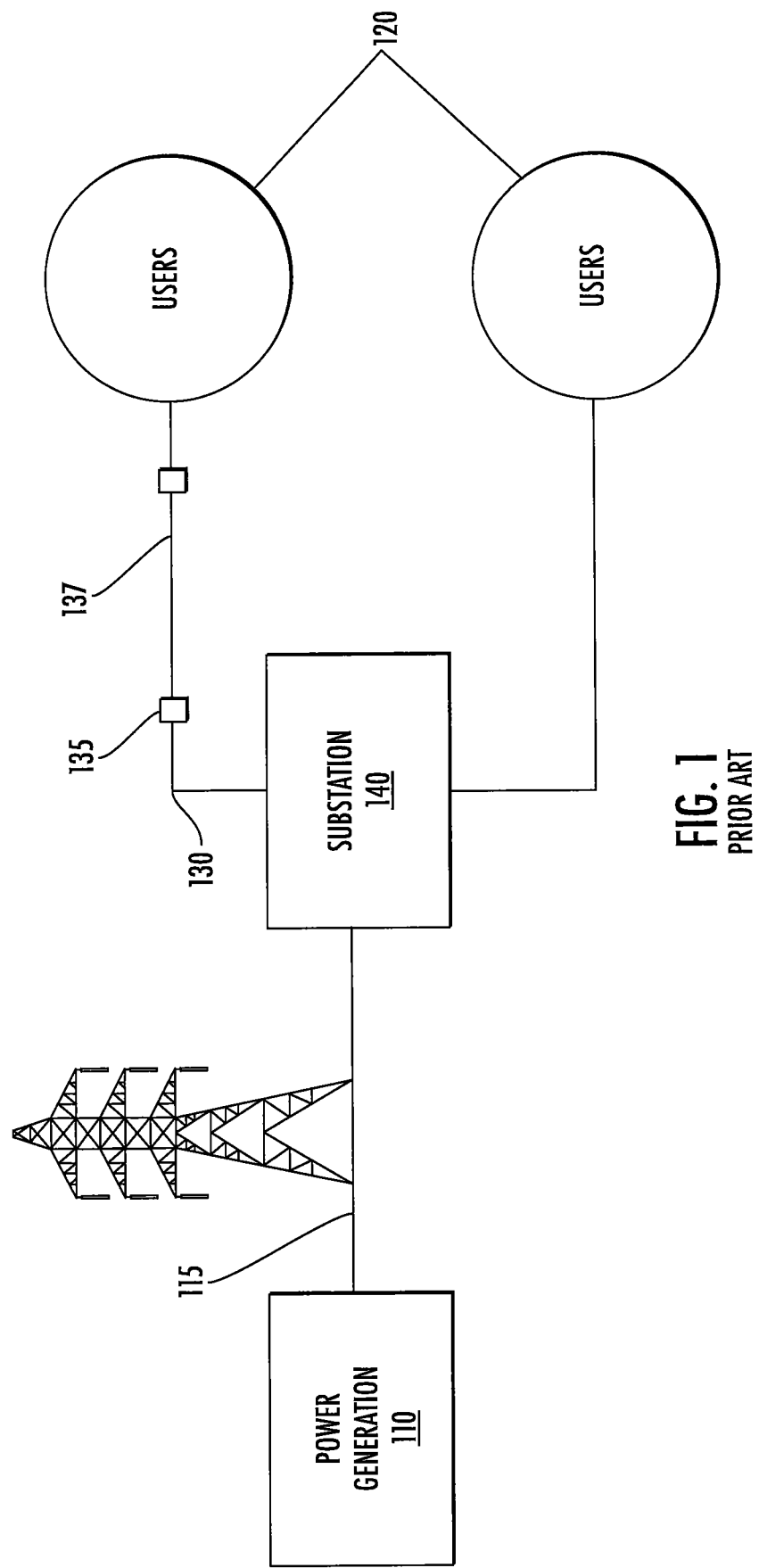
FIG. 1 is a simplified block diagram illustrating an example electrical power distribution environment.

Various embodiments will be described more fully hereinafter with reference to the accompanying drawings. Other embodiments may take many different forms and should not be construed as limited to the embodiments set forth herein. Like numbers refer to like elements throughout.

The embodiments described herein result, in part, from a realization that methods, devices, and computer program products are needed which can accurately provide modifications to a power distribution grid that decrease downtime by predicting, and correcting, power distribution violations over short-term and/or long-term durations.

Conventionally, planning for power distribution grids may only consider single feeders or substation banks as individual needs, addressed one at a time. However, emerging distribution-tied assets (e.g., solar photovoltaics, battery energy storage) and/or advanced customer sited technologies (e.g., customer power generation options) offer a multitude of options for the power distribution grid that are capable of addressing needs across multiple feeders or substation banks.

For example, some of these new types of assets, connected to the power distribution grid, may now be used to meet the needs of a power transmission system and the power generation equipment within other parts of the power distribution grid. An electric utility will benefit from the consideration of the bulk (power generation and transmission) system needs as an input to distribution planning, and thus across the same time horizon, so as to develop optimal integrated resource plans and/or to physically alter the power distribution grid in an efficient manner. In some embodiments, the use of additional resources may provide stacked benefits to the power distribution grid that a planning model can enumerate and leverage.

Developing improved integrated resource plans may cause distribution planning to move from its current time horizon (1-3 years) to a longer time horizon (5-10 years). The longer time horizon may require innovation to the distribution investment planning tools to address more complex spatial and temporal relationships as well as the consideration of assets in a transmission system and generation fleet serving the same customer base. Similarly, physically altering the power distribution grid in an efficient manner over a shorter-term (including durations on the order of hours or minutes) may require more complex systems than can incorporate the multiple spatial and temporal impacts and/or benefits that may occur from moving and/or installing equipment in the power distribution grid.

Objectives of the inventive concepts include identifying possible power distribution system issues or missed opportunities that can occur due to unoptimized asset placement across the power distribution grid, sizing, and/or investment in the distribution system when considering future load growth, and planned and operational changes to the distribution system against identified constraints and needs.

Further objectives of the inventive concepts include identifying possible asset choices (solutions) that could alleviate the identified issues, and mapping solutions to the identified issues. In some embodiments, the solutions may be mapped in more complex relationships beyond a one-to-one correspondence, such as, for example, one solution to solve many identified issues and/or many solutions to solve many identified issues.

Further objectives of the inventive concepts include the ability to value each potential solution to create a distribution integrated resource plan that captures power distribution system benefits as well as reliability, resiliency, environmental impacts, power factor optimization, loss minimization, market opportunity, and/or public relations impacts.

Further objectives of the inventive concepts include the ability to confirm the viability of a chosen set of solutions for identified issues as well as possible future scenarios.

Further objectives of the inventive concepts include the ability to automatically and autonomously (i.e., without any user input) modify the power distribution grid in response to the identified solutions. In some embodiments, some modifications to the power distribution grid may utilize non-autonomous input for implementation. For example, some modifications may include infrastructure development (e.g., construction, deployment, and/or physical configuration) that may augment autonomous operations.

The problem space for power distribution planning is sometimes classified as a complex mixed integer nonlinear optimization problem, such as that described in "A review of power distribution planning in the modern power systems era: Models, methods and future research," by Georgilakis and Hatziargyriou, Electric Power Systems Research, 2015, 121, p90. However, the problem space may also be defined in terms of a learned multi-selective optimization problem using agent based scenarios with reasoning which is significantly different from the published models, such as those of Georgilakis and Hatziargyriou.

For example, the problem may be defined in terms of the orchestration (machine learning and selecting of various algorithms and methods that can be applied) and automation of the various features and functions available using an electric industry ontology to hold the features and functions. For example, nodes/assets within the power distribution grid may perform a decentralized analysis of those portions of the power distribution grid that are proximate and/or interconnected with the node/asset. In this way the system self-optimizes distribution planning in a similar fashion to a self-optimizing grid, thus innovating beyond the current experience-driven distribution planning with an engineered process with advanced analytics.

Figure 2:
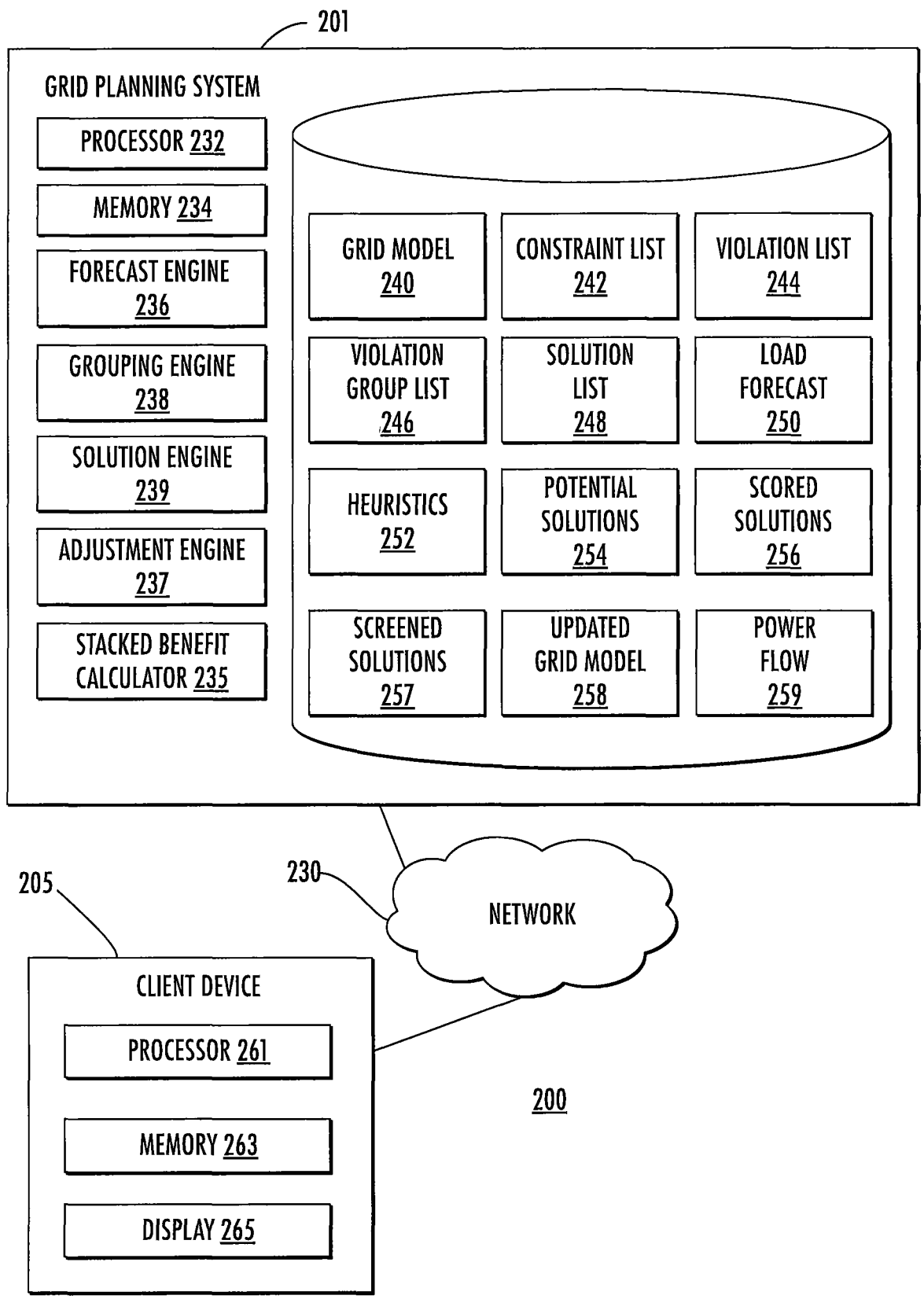
FIG. 2 is a simplified block diagram illustrating an example computing environment, according to embodiments described herein.
Figure 3:
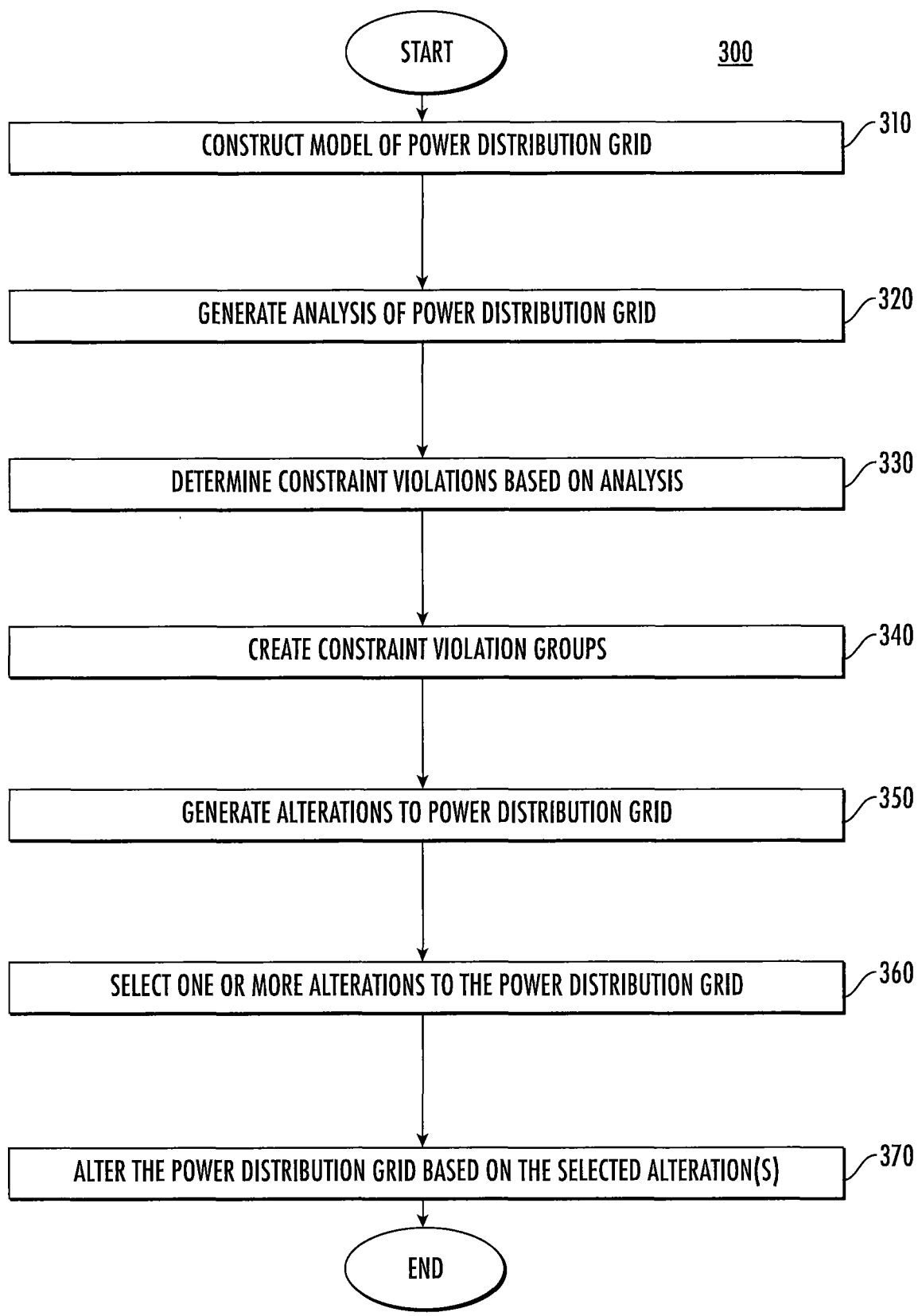
FIG. 3 is a flow chart of operations for analyzing and altering a power distribution grid, according to embodiments described herein.

FIG. 3 is a flow chart of operations 300 for analyzing and altering a power distribution grid, according to embodiments described herein. In some embodiments, the operations 300 may be performed by a computing environment 200 illustrated in FIG. 2, which will be described herein in greater detail. The operations 300 are described for a particular power distribution grid. However, it will be understood that the operations of FIG. 3 may be performed for one or more power distribution grids either concurrently and/or consecutively. Similarly, though listed for a power distribution grid, the operations 300 may be performed on more granular elements of a power distribution grid as well, such as electrical distribution segments that are portions of a power distribution grid.

The operations 300 may begin with block 310, in which a graph of the power distribution grid may be generated. The graph may be a structure used to model the power distribution grid. The graph may include nodes (or vertices) and edges. The nodes of the graph may represent specific assets within the power distribution grid. For example, nodes in the graph may be a substation, transformer, customer power meter and/or load, a recloser, a battery, or other asset associated with power generation, consumption, and/or delivery. Edges in the graph may be transmission paths between the various assets (nodes). For example, edges in the graph may be feeders, conductors, or other mechanisms used to deliver power within the power distribution grid.

Each of the nodes and the edges of the graph may be further associated with data. For example, each node in the graph may include details related to the underlying asset of the node. For example, a given node may represent a transformer, and data may be associated with the node to indicate the type of equipment, a power rating and/or other capacity of the transformer, age of the transformer, etc. The data may also include rules associated with the node. For example, if the node is a transformer, the rules may include seasonal power ratings under which the transformer may be operated.

Each edge in the graph may also be associated with data and rules. For example, if an edge is a conductor, the data may include a format of the conductor (e.g., underground or above-ground), a capacity of the conductor, etc. Similarly, rules associated with the conductor may include conditions under which connections/taps may be added to the conductor and/or other limits of use on the conductor.

The combination of nodes and edges of the graph that models the power distribution grid may represent an ontology of the power distribution grid. As used here, the ontology of the power distribution grid represents a model of the relationships within the power distribution grid and/or the characteristics of the various elements and relationships within the power distribution grid. For example, in some embodiments, all nodes within the graph may be assets with associated attributes and all edges within the graph may show connectivity between those assets.

Figure 5:
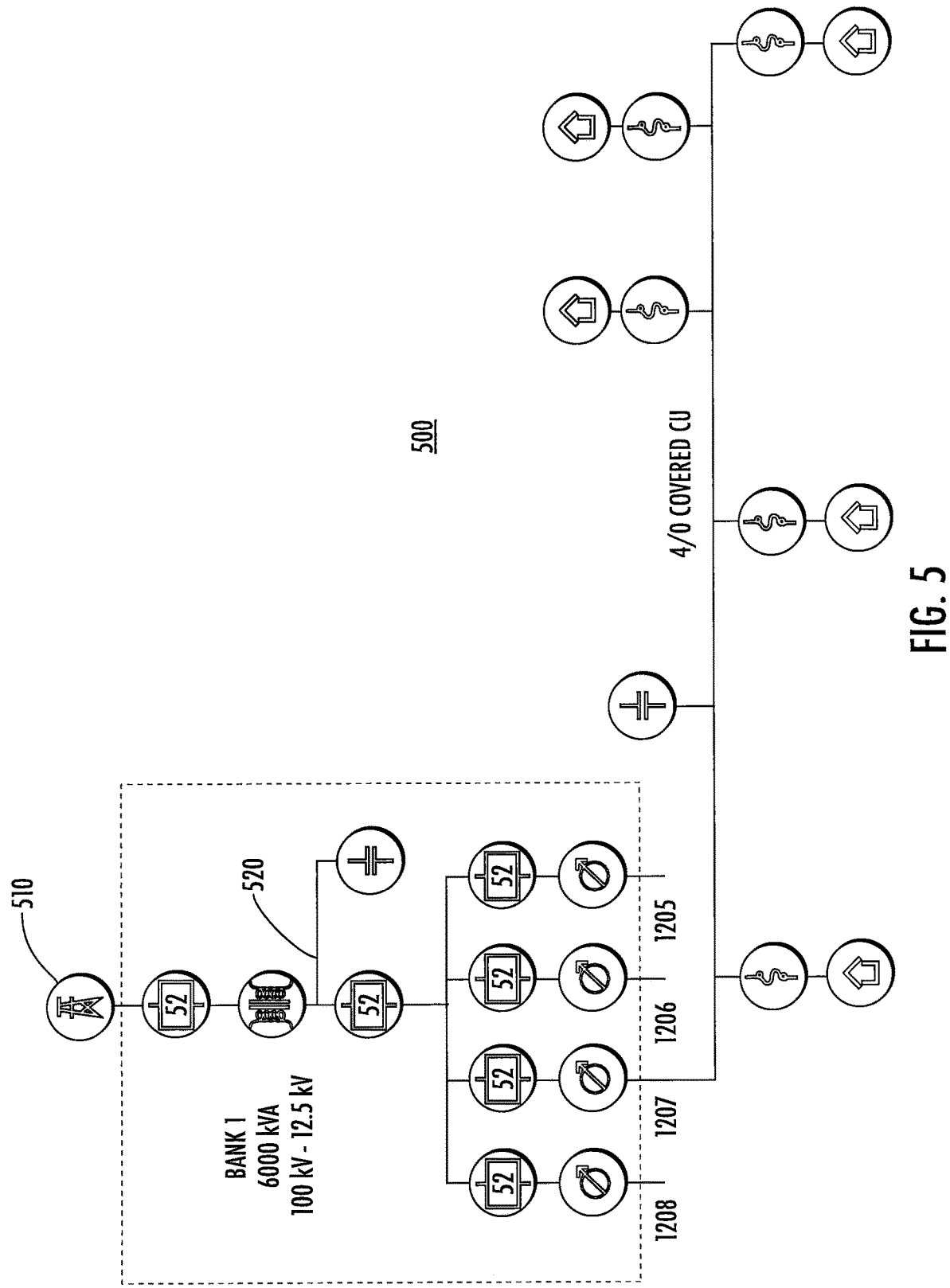
FIG. 5 is a schematic view of an example graph for a portion of a power distribution grid, according to embodiments described herein.

FIG. 5 is a schematic view of an example graph for a portion of a power distribution grid, according to embodiments described herein. As illustrated in FIG. 5, the graph 500 may include nodes 510 connected by edges 520. Different nodes of the graph 500 may be represented with different symbols that identify the underlying asset, but the embodiments described herein are not limited thereto.

The graph may be updated periodically based on detected changes to the power distribution grid. In some embodiments, the graph may be updated automatically when changes are detected within the power distribution grid. In some embodiments, changes to the power distribution grid may be automatically detected from within the grid, and communicated within the grid using communication circuitry associated with the power distribution grid. An example communication circuit is illustrated in U.S. Pat. No. 9,829,899 to Handley, et al. filed on Sep. 30, 2015, entitled "Apparatuses including utility meter, power electronics, and communications circuitry, and related methods of operation," the contents of which are included by reference herein. The Open Field Message Bus (OFMB) is an example of a communication network that may be used to communicate dynamic changes to the power distribution grid.

In some embodiments, the graph may be automatically checked by algorithms which analyze each of the nodes and edges for consistency and/or compliance with known rules related to the power distribution grid. Inconsistencies in the graph may be flagged for additional inspection and/or adjustment.

The model of the power distribution grid may also include usage data related to the power distribution grid generally, as well as usage data related to the individual elements of the power distribution grid (e.g., the nodes and edges) that are represented by the model graph. The usage data may include both past and predicted future usage data. The future usage data may be based on other known data, such as manufacturing trends, relocation trends, weather, climate, economic and technology adoption scenarios, etc.

Referring again to FIG. 3, once the model of the power distribution grid has been generated, the operations 300 may continue with block 320 in which an analysis of the power distribution grid may be generated. The power distribution grid analysis may include generating a simulation of operation and transmission of power throughout the power distribution grid over a predetermined duration. For example, the analysis may be performed over a ten year period, with simulated data points generated for every hour of the ten-year period, though the embodiments described herein are not limited thereto.

In some embodiments, generating the analysis of the power distribution grid may include running a power flow analysis for every hour of a 10 year load forecast for the power distribution grid, which may generate 87,600 power flows for each circuit of the power distribution grid. In some embodiments, real power, reactive power, current, and voltage for every element in the circuit may be stored for every power flow run. The hourly runs described herein are merely an example and are not intended to limit the embodiments described herein. In some embodiments, the power flow analysis may be performed at granularities of minutes, seconds, or sub-seconds.

In some embodiments, prior to generating the power flow analysis, a pre-screening may be performed on the power distribution grid. For example, the pre-screening may cut down on the overall burden of evaluating thousands of power flows every time a circuit is updated. The pre-screening step may only run the winter and summer peaks and valleys for the 10 year planning horizon. If issues are identified, the circuit will be added to a screened circuit list for further analysis, otherwise it may be excluded from further analysis.

Once the analysis of the power distribution grid has been generated, the operations 300 may continue with block 330 in which constraint violations are determined based on the analysis. This operation may determine all of the elements of each circuit that experience a violation, where the element is physically located, how many times the element experienced a violation, and/or the duration of the violation for each occasion. As used herein, a constraint violation, or violation, refers to a deviation of operation of an element of the power distribution grid from constraints associated with the element. The constraint may be, for example, a rating of the underlying element, such a power or thermal rating.

In some embodiments, the constraint may be an availability constraint. For example, the analysis of the power distribution grid may forecast outage probabilities or reductions in power availability across the forecast period. The electric power distribution industry currently uses various industry standard metrics to evaluate delivery performance and/or prioritize capital investments. For example, metrics such as the Customer Interruptions (CI), Customer Minutes of Interruption (CMI), System Average Interruption Frequency Index (SAIFI), and System Average Interruption Duration Index (SAIDI) exist to provide high-level characterization of user outages. These metrics may be calculated at the power grid level, the electrical distribution circuit level, the segment level, etc.

CI is the number of users that experience an interruption for a given measured element (e.g., an electrical distribution circuit and/or an electrical distribution segment).

CMI is the number of user minutes of interruption that occur for a given measured element (e.g., an electrical distribution circuit and/or an electrical distribution segment).

SAIFI is the average number of interruptions that a user (e.g., a power customer) would experience, and is calculated as:

$$SAIFI = \frac{CI}{N_T}$$

where CI is the total number of users interrupted and $N_T$ is the total number of users served. In other words:

SAIFI=(total number of user interruptions)/(total number of users served)

SAIFI is measured in units of interruptions per user.

The System Average Interruption Duration Index (SAIDI) measures average outage duration for each user served, and is calculated as:

$$SAIDI = \frac{CMI}{N_T}$$

where CMI represents the total number of minutes of interruption experienced by a user and $N_T$ is the total number of users served. In other words:

SAIDI=(sum of all user interruption durations)/(total number of users served)

SAIDI is measured in units of time, often minutes or hours.

In some embodiments, elements of the power distribution grid may have one or more constraints related to the above-described metrics (e.g., SAIFI, SAIDI, CMI, CI, etc.) that are to be maintained during operation of the element.

Determining the constraint violations may include comparing the power flow analysis performed, for example, in block 320 with a constraint list. The constraint list may include identified constraint(s) for each of the assets of the power distribution grid, and thus each of the nodes and edges of the model graph. The output of the power flow analysis performed in block 320 may be compared against the constraint list to determine if constraint violations are present within the forecast duration.

Circuits with a minimal amount of DER penetration (e.g., <25% of native minimum load) may be largely unaffected at minimum loading in shoulder months so, in some embodiments, only winter and summer peaks may be considered. Circuits with high DER penetration (e.g., >25% of native minimum load) may utilize additional screening to determine if steady-state overvoltage, back-feeding, or thermal constraints are an issue during circuit minimum loading and maximum DER generation.

Figure 6:
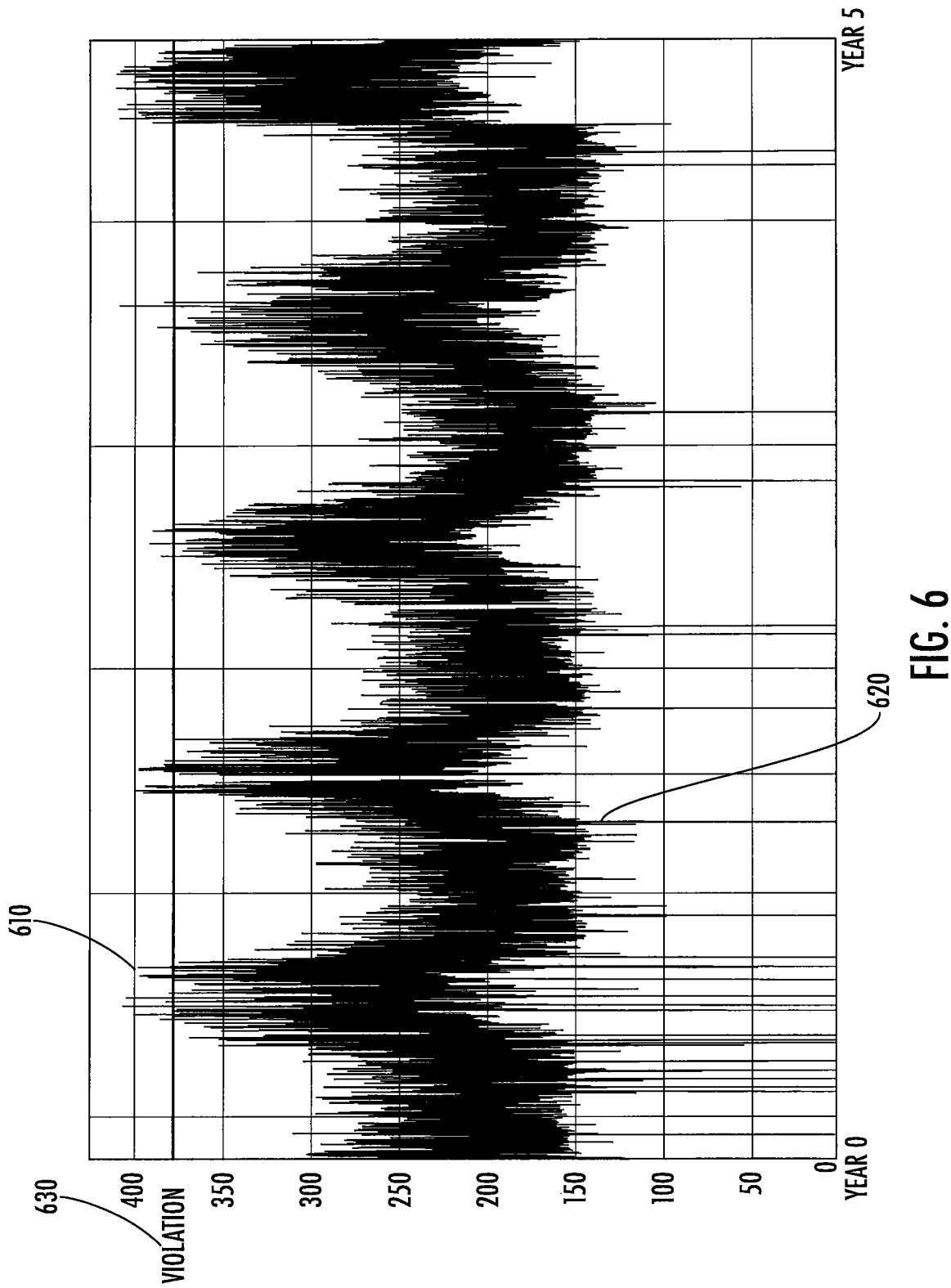
FIG. 6 illustrates an example power flow graph for a given element in a power distribution grid.

FIG. 6 illustrates an example power flow graph for a given element in a power distribution grid. As illustrated in FIG. 6, the power flow graph may include seasonal peaks 610 and valleys 620 over a predetermined duration of predicted operation (e.g., five years). By comparing the predicted operation of the element, a violation (e.g., violation 630) may be identified in which the operation of the element exceeds a given constraint.

The output of block 330 (FIG. 3) may include a circuit asset constraint violation list, which provides a temporal dimension of an issue that can be addressed by solution(s) in later operations. FIG. 7A illustrates an example of a constraint violation list according to embodiments described herein. As illustrated in FIG. 7A data about the constraint violations may include the type of asset that is involved in the violation (asset class), a type of violation that is predicted to occur (constraint violation), and/or the predicted time at which the violation will occur (violation time profile). Other information may be included which indicates the extent of the constraint violation.

Referring again to FIG. 3, once the constraint violations for the power distribution grid have been determined, the operations 300 may continue with block 340 in which constraint violation groups are generated. This operation may group the circuit asset constraints that were previously identified into possible groups that could potentially be solved by a single solution or a group of solutions. These groups may be formed based on a set of heuristics that assess the spatial and temporal locality of individual violations to assess their ability to be grouped. As used herein, heuristics refer to predefined data-driven rules that may be used to rank intermediate decisions. The use of heuristics may allow for a fast decision-making process when processing large batches of data. In some embodiments, the heuristics may be self-modifying, such that the rules used in the heuristics are modified based on successful/unsuccessful operations of previous computations. The output of this operation may include a list of possible violation groups. This grouping may establish the spatial dimension of an issue (e.g., a constraint violation) that needs to be addressed by a solution in later steps. The spatial dimension may be constrained by the current and planned physical power distribution grid.

Creating the list of the constraint violation groups may include the use of a rules engine and a set of violation group heuristics to determine how violations can be grouped so that one solution may solve multiple issues. The rules engine may take into account the temporal and spatial relationship between individual violations in order to group them. FIG. 7B illustrates a set of grouped violations according to embodiments described herein. As illustrated in FIG. 7B data about the grouped violations may include the types of assets that are involved in the grouping, a spatial relationship between the assets of the group, and/or a temporal relationship between the violations of the assets of the group (e.g., the violations occur within a particular timeframe with respect to one another). For example, FIG. 7B illustrates a first grouping 'A' that is a constraint violation of a substation transformer, a second grouping 'B' that is a constraint violation of a grid conductor, and a third grouping 'C' that combines the substation transformer and grid conductor constraint violations into a single grouping.

Once the constraint violations have been grouped, the operations 300 may continue with block 350 in which alterations to the power distribution grid are generated to address the constraint violations. The alterations to the power distribution grid may be used to provide, in part, solutions to the identified constraint violations. This operation may look across multiple features of the solutions, including cost, to optimize and score all of the possible solutions.

Figure 4A:
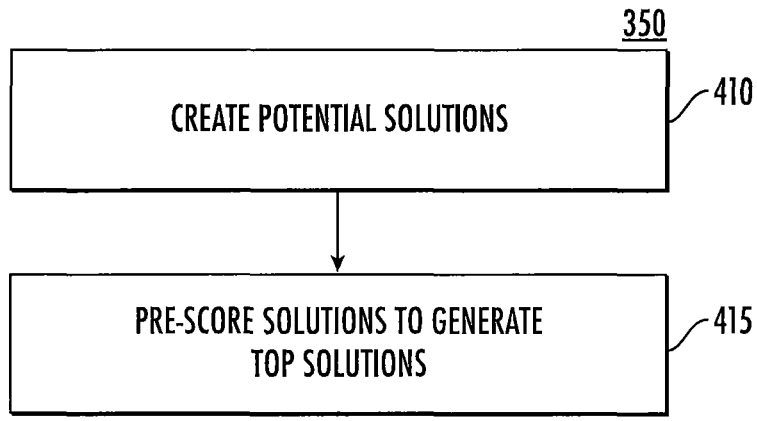
FIG. 4A is a flow chart of sub-operations for generating alterations to the power distribution grid, according to embodiments described herein.

Block 350 to generate the alterations to the power distribution grid may include sub-operations, as illustrated in FIG. 4A. More specifically, after the list of all violation groups has been created, solutions may be created in block 410. The created solutions may be mapped to these violations using a reinforcement learning algorithm and a rules engine that utilizes a solution-to-violation mapping list. In some embodiments, the solution-to-violation mapping list is the mapping of all solution types that could feasibly solve a violation type. For example, a thermal conductor overload could feasibly be solved by reconductoring a circuit to increase its thermal capacity.

The solutions that are available to be applied may be provided as an input to this operation and may include, for example, the operating characteristics of the solution, cost characteristics and qualitative scoring for reliability, resiliency, environmental impact, power factor optimization, loss minimization, market opportunity, and/or public relations impact. If a solution has a potential bulk system benefit, such benefit may be an input captured in the solution characterization as well. FIG. 8 illustrates an example of solutions that may be available to be applied to the power distribution grid. As illustrated in FIG. 8, the data related to the available solutions may include the type of asset class to which the solution applies, a time to implement the solution, cost data to implement the solution, and/or one or more scores related to the impact of the solution in one or more areas of interest with respect to the power distribution grid (e.g., solution reliability, solution resiliency, environmental impact of the solution, a power factor optimization of the solution, loss minimization of the solution, the solution's market opportunity, public relations impacts of the solution, etc.). The scores may be used to assist in identifying potential solutions for the constraint violations. Identifying potential solutions for the constraint violations may include utilizing the learning algorithm and rules engine to determine if a particular solution from the list may be appropriate for a given constraint violation. The output of block 410 may include a potential solution list representing all feasible solutions for one or more of the constraint violation groups identified in block 340.

It should be noted that the list of potential solutions may include groups of solutions designed to address multiple constraint violations simultaneously. FIG. 9 illustrates an example list of potential solutions for the constraint violations of the constraint violation groups illustrated in FIG. 7B. For example, as shown in FIG. 9, providing a new substation transformer and a new reconductor may address the violation groups A and B illustrated in FIG. 7B, and may be combined into a solution group (identified as Solution Group 1). Similarly, providing a new substation may also be combined with adding an ESS element to the circuit to address the violation groups A and B. These alterations may be grouped into a separate solution group (identified as Solution Group 2). As noted herein, these combinations of alterations to the power distribution grid may be generated based on a learning algorithm and a rules engine configured to identify the impact of the various power distribution grid alterations and create various combinations of the alterations into a set of solutions.

In some embodiments, developing the list of solutions may be based on performing an optimization of the graph representing the power distribution grid. In some embodiments, the optimization operations may be actively distributed within nodes of the power distribution grid. For example, a first asset (node) of the power distribution grid may generate a first set of solutions based on a first subset of the power distribution grid and a second asset (node) of the power distribution grid may generate a second set of solutions based on a second subset of the power distribution grid. In some embodiments, determining potential solutions may be performed in a decentralized manner by assets of the power distribution grid (e.g., nodes of the graph of the power distribution grid) so as to analyze subsets of the grid.

In some embodiments, developing a list of solutions can include computerized operations incorporating i) pure heuristic, ii) heuristic with learning, iii) centralized optimization, iv) centralized optimization with learning, v) distributed optimization, and/or vi) distributed optimization with learning. In some embodiments, a pure heuristic solution may include a rules engine. When operations ii), ii), and/or iv) are used, centralized computing resources may be used. When operations v) and/or vi) are used, the computation of the solution options may occur in a decentralized fashion in the communication nodes of the power distribution grid using intercommunication between the communication nodes for data interchange (e.g., making use of OFMB or other standard). For example, communications nodes such as an agent node appliance, discussed further herein, may compute the solution options. In some embodiments, operations utilized in operations v) and vi) may include implementations based on a hierarchical Stackelberg game with the following order: Operations->Planning->Operations and Planning->Operations, as described in Gabriel, S. A., Conejo, A. J., Fuller, J. D., Hobbs, B. F., & Ruiz, C. "Complementarity modeling in energy markets," International series in operations research & management science, 2012, p. 118.

For example, referring back to FIG. 5, a particular asset of the power distribution grid (e.g., represented by node 510) may operationally contain a processor and/or memory configured to select solutions for portions of the power distribution grid that are coupled to the asset. The asset may communicate with other portions of the power distribution grid through communication mechanism, such as, for example, the Open Field Message Bus discussed herein. In this way, subsets of the power distribution grid may perform a decentralized optimization of portions of the power distribution grid. Individual solutions that are determined may be transmitted to nodes higher in the asset hierarchy (e.g., "upstream") for further calculations. By performing the solution determination in a decentralized manner, the calculations may be made closer to the source. In addition, the final determination for the number of solutions to be provided over the power distribution grid may be made based on a smaller subset of potential solutions, as solutions which are untenable or otherwise non-preferred may be removed from consideration at lower levels in the power distribution grid.

The selection of the list of potential solution may be performed, in some embodiments, as an optimization problem. An example discussion of optimization problems is provided, for example, in Li, R., Wang, W., Chen, Z., Jiang, J., & Zhang, W. (2017). "A review of optimal planning active distribution system: models, methods, and future researches." Energies, 10(11), 1715. For example, a technical solution may use multi-objective criteria planning algorithms using centralized computation. An example formalism of advanced distribution systems optimization using multi-objective criteria planning algorithms may be given by:

$$\min F(x_{st}, y_{st}) = [OF_i, \ldots OF_M]$$

$$\text{s.t.} \left\{ \begin{array}{l} G(x_{st}, y_{st}) = 0 \\ H(x_{st}, y_{st}) \le 0 \\ 1 \le st \le N_{ST} \end{array} \right\}$$

where:

$x_{st}, y_{st}$ are the decision variables for determining potential solutions through distribution planning. The decision variables may include, but are not limited to, locations and sizes of new substations, sizes of existing substations for reinforcement (e.g., changes), locations and sizes of new feeders, sizes of feeders for reinforcement, locations of reserve feeders and interconnection switches (as used for active network reconfiguration to improve reliability and/or reduce financial loss brought about by an outage), locations, sizes, types of and allocation of dispatchable distributed generation (DDGs), locations, sizes, types and allocation of renewable distributed generation (RDGs), locations of new dynamic active load demand (e.g., charging stations for electric vehicles (EVs), demand management systems as used for demand response), locations and sizing and types of centralized/decentralized ESSs, operation and maintenance costs of ESSs, locations and sizes of voltage control devices e.g., capacitor banks and static var compensators (SVCs) (as used for coordinated volt-var control), forecasted load growth for investment (by circuit), network topology changes, allocation of DERs and associated information, cost of purchased energy, system power loss cost, and/or Demand Response (DR) incentives cost.

$OF_1, OF_2, \ldots, OF_M$ are the optimal objectives of distribution planning. The objectives may include, but are not limited to, economic objectives (including, for example, minimization of investment and operational costs, minimization of network losses, maximization of net present value of assets), technical objectives (including, for example, maximization of system reliability, improvement in voltage profile, mandatory or recommended technical standards, minimization of power curtailment level of RDGs), and environmental objectives (including, for example, meeting carbon emission quotas, policy commitments to maximize RDG penetration and other measures, maximization of subsidy for RDGs, meeting agreements for environmental standards.) The environmental objectives may be defined in terms of economic factors, such as a reliability cost and/or economic cost.

G(.) are the equality constraints of the solver.

H(.) are inequality constraints of the solver.

Both G(.) and H(.) may be a combination of technical constraints, economic constraints, and/or spatial constraints which may be bounded by the temporal constraints $N_{ST}$.

Common technical constraints may include, for example, radial operation of networks for full connectivity, size limits of substations and feeders (potential obstacles to increasing penetration of DERs), power flow constraints, active/reactive power balance equations solved by a power-flow engine, permissible range of bus voltage magnitude (potential obstacles to increasing penetration of DERs), position limits on on-load tap changer (OLTC), ramp constraints of DDGs, power production constraints of DDGs and RDGs, operation constraints of ESSs, and/or operation constraints of DR.

Common economic constraints may include, for example, budget limits for distributed system operators (DSOs) to build substations and feeders, budget limits for distributed generation operators (DGOs) and DSOs to install DGs, and/or maintaining positive profit for each individual DG investor to make the investment more attractive.

Common spatial constraints may include, for example, geographical condition of circuit(s) and changes to circuits, and/or environmental concerns of installation of DGs, such as Distributed Wind Generation (DWGs), Distributed Photovoltaic (DPVs), gas turbine, and gas transmission pipeline.

$N_{ST}$ is the number of planning stages; which may range, in some embodiments, from a static planning model of 0 to a dynamic multi-stage planning model of 1.

Two methods may be used to reduce the complexity of the objective function: weight coefficient methods and Pareto based methods. At least one technical objective of the operations to determine a set of potential solutions to a given constraint violation is to solve a nonlinear optimization problem with multiple decision variables and multiple constraint conditions in a dynamic, adaptive environment. Both numerical and heuristic methods may be used. Classic numerical methods using solvers such as Gurobi, Sparse Nonlinear Optimizer (SNOPT), Interior Point Optimizer (IPOPT) and CONOPT (see e.g., http://www.conopt.com) have been shown to not converge to a solution when there is high dimensionality, and higher dimensionality is expected with the addition of DERs, DGs and ESSs. Heuristic methods include genetic algorithms (GA), particle swarm optimization (PSO), differential evolution (DE), and artificial Bee colony (ABC), but each individually has strengths and weaknesses. Combinations of numerical methods and heuristic methods have been shown to work well.

In some embodiments, determining the list of potential solutions may be accomplished in a centralized and/or decentralized manner. For example, in a centralized environment, the list of potential solutions may be determined by a centralized server and/or node, with communications relating to potential solutions transmitted from the centralized server to the individual assets being altered and/or affected.

For example, in a decentralized environment, the list of potential solutions may be determined via event based communication between discrete components, such as communication over OFMB, between assets (nodes) of the power distribution grid. The list of potential solutions may be determined by rules-based automation, including the machine learning of new rules. In some embodiments, the potential solutions may be selected using contract based constraint satisfaction. Embodiments described herein may use one or more computing/communication nodes that are distributed across the power distribution grid to perform pieces of an Optimization Problem Constrained by other Optimization Problems (OPcOPs) to solve the bi-level problem of distribution planning and distribution operation to determine the potential solutions within the power distribution grid using the computational units (e.g., the computing/communication nodes) in the power distribution grid that can perform the computation. In some embodiments, the computing/communication nodes may be the assets within the power distribution grid, such as the assets represented by nodes in the model graph. In some embodiments, the computing/communication nodes may be separate element that are coupled to the assets within the power distribution grid that may be capable of interacting with the assets. Thus, given a network of computing/communication nodes within the power distribution grid, the computation may ripple through the connected hierarchy, where one computing/communication node communicates to the next when determining actions. Since each computing/communication node has heuristics (can make decisions on its own), the selection of the potential solutions of the power distribution grid can be solved by hierarchical nodal optimization with intelligent agency. In addition to, or as an alternative to, heuristics, the computing/communication node may also may employ other methods such as, for example, weights, probabilities, learned network, curves etc.

As a non-limiting example, to manage DERs, the conventional distribution planning may be modified to resolve resource allocation problems and/or constraint satisfaction and to include the perspectives of multiple stakeholders and multiple dimensions. Since ESSs can perform multiple important roles in the power distribution grid (e.g., peak load shaving, valley load filling, network upgrade deferral, frequency voltage control, power quality improvement, reliability improvement, alleviating the fluctuations in renewable distributed generation sources, obtaining arbitrage benefit, reducing energy losses and providing a time varying power energy management), their optimal placement and sizing may be important to power distribution planning and distribution operations. In some embodiments, for the transactive energy distribution system, value may be enacted (attributed) to actions made by the containerized computation (of hierarchical node optimization algorithm) in the computing/communication node. For example, an Electric Vehicle (EV) travelling along a street that may be sent location-based pricing signals by a computing/communication node on a circuit of the power distribution grid to an onboard communication node of the EV which may then make an optimized plan out of its decision variables (state of charge, destination, value). As another example, an EV travelling along a street may send location based capacity and discharge signals from its on-board computing/communication node, to the computing/communication node of the local circuit. The computing/communication node in the circuit may make decisions about charging and discharging the EV battery and/or route messages to a hierarchical node in the communication network to make an optimization decision.

Once the list of potential solutions has been identified, the list may, in some embodiments, be pre-scored in block 415 to generate a list of top solutions. Pre-scoring is an optional step and may be omitted without deviating from the embodiments described herein.

The potential solution list may contain every possible solution, possibly thousands, represented as alterations to the power distribution grid that may address the identified constraint violation groups. In order to reduce overall computing requirements, the application may pre-score each of the solutions based on variables, including user defined variables based on objectives in the specific scenario. For example, some solutions may be scored based on time to implement, cost, capturing market opportunity, etc. In some embodiments, characteristics of the underlying solution, such as those illustrated in FIG. 8, may be used (e.g., time to implement, cost multiple, reliability, resiliency, environmental impact, power factor optimization, loss minimization, market opportunity, public relations, etc.) After each solution is pre-scored the solution list may be filtered to only evaluate the top solutions. In some embodiments, this prioritization may be achieved using intelligent agent based reasoning systems that balance regional and sub-regional customer preferences in addition to economic metrics.

Figure 4B:
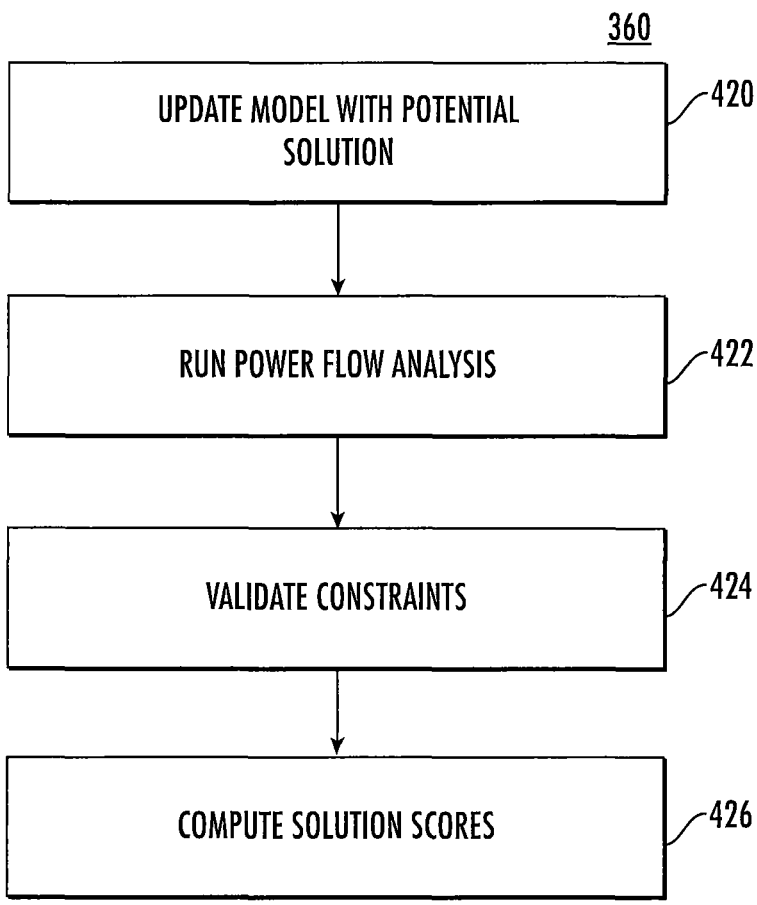
FIG. 4B is a flow chart of sub-operations for selecting the alterations to the power distribution grid, according to embodiments described herein.

Referring again to FIG. 3, once the list of potential solutions have been generated, the operations 300 may continue with block 360 in which one or more of the potential solutions (or pre-scored solutions) including alterations to the power distribution grid are selected for implementation. Block 360 for selecting the alterations to the power distribution grid may include sub-operations, as illustrated in FIG. 4B. The sub-operations of FIG. 4B may be performed for each of the potential solutions (or pre-scored solutions).

Referring to FIG. 4B, a respective potential solution may first be applied to the model of the power distribution grid. As discussed herein, the potential solution may include one or more alterations to the power distribution grid. These alterations may be incorporated into the power distribution grid model. For example, if the solution adds new assets to the power distribution grid (e.g., a substation), the substation, along with its relative characteristics, may be added as a node in the model of the power distribution grid. This may include updating the model graph (e.g., generated in block 310) with the potential solution in block 420. For example, a solution that incorporates a new conductor may be added as an edge to the model of the power distribution grid. Because the model is virtual, these modifications may be made without physically updating the power distribution grid. This enables automated validation of the proposed solutions through power flows in the next operations.

Once the potential solution is incorporated into the power distribution grid model, simulated power flows may be run against the altered model in block 422. The power flow may be run to generate an analysis of active power, reactive power, current and voltage at every element for the predetermined forecast duration (e.g., 10 years) hourly load forecast for each separate solution. In some embodiments, the power flow analysis may be run to simulate operation for every hour of the predetermined forecast duration.

After the power flow analysis is complete, the results of the power flow may be analyzed in block 424 to validate that the potential solution solves the constraint violations that it was intended to address and, as well, does not generate other constraint violations. In some embodiments, this may include validating that the potential solution resolves each of the constraint violations in a constraint violation group (e.g., a plurality of constraint violations). In this operation, spatial and temporal dimensions discussed previously are observed once more.

Next, in block 426, the solution scores for the potential solution may be calculated. The solution score will be based on the operating characteristics of all of the alterations incorporated into the potential solution. Examples of the operating characteristics are included in FIG. 8 and may include, without limitation, cost characteristics and qualitative scoring for reliability, resiliency, environmental impact, power factor optimization, loss minimization, market opportunity, and/or public relations impact. The solution score may be a weighted combination of these factors, with the final score reflecting priorities of the final implementation. For example, solutions which minimize power loss may be given a higher weight than other solutions.

When all of the potential solutions have been scored, the highest weighted solutions may be selected. In some embodiments, selection of alterations to the power distribution grid may continue until all of the constraint violations have been addressed, though the embodiments described herein are not limited thereto. Referring again to FIG. 3, once all violations have been accounted for through solution selection, the alterations to the power distribution grid that are associated with the selected solutions may be coalesced and implemented into the power distribution grid in block 370.

In some embodiments, the alteration to the power distribution grid may be—performed automatically. For example, in some embodiments, the power distribution grid may incorporate switching elements which may be configured to switch a particular asset from one portion of the power distribution grid to another portion of the power distribution grid. For example, for a potential solution that incorporates additional ESS resources, an ESS may be automatically switched within the network to implement the proposed solution without requiring additional human intervention. Other examples of alterations that may be performed automatically include demand response programs that are implemented within the power distribution grid. Demand response programs include mechanisms to adjust the flow of power through a power distribution grid from the demand side. While some demand response programs are based on incentives, such as off-peak prices, automated demand response programs exist as well. For example, communication may be provided to elements within the power distribution grid that adjust and/or throttle loads connected to the network and/or enable/disable ESS resources connected to the network. An automated demand response mechanism may involve turning down or off certain appliances or loads (and, when demand is unexpectedly low, potentially increasing usage). For example, heating temperatures for heating systems may be reduced and/or cooling temperatures for air conditioning or refrigeration may be increased, thereby reducing a load on the power distribution grid.

Similarly, though the description herein describes predetermined forecast times on the order of years, it will be understood that the embodiments described herein are not limited thereto. In some embodiments, the predetermined forecast time may be on the order of hours, or even minutes. In such embodiments, the power flow measurements may be based on more recent demand loads in the power distribution grid. Because the embodiments described herein are automated, they may provide a more efficient means of managing multiple evaluations over a shorter duration than humans would be capable of processing. Moreover, as the embodiments described herein provided automated control over the alteration of the power distribution grid, such alterations can be made automatically and autonomously without additional human input.

By automating the adjustment to the power distribution grid in response to the forecasted violations, adjustments may be made to the power distribution grid more quickly, thereby increasing the overall savings within the grid. Moreover, by distributing the analysis throughout the assets (nodes) of the power distribution grid, detecting and solving constraint violations may be performed closer to the source of the violation, increasing the speed and accuracy of the solution. The increasing usage of DER resources also increases the variability of the power distribution grid. In order to adequately respond to dynamic shifts in DER usage (e.g., as electric vehicles charge at different locations throughout the grid), the planning forecast benefits from the ability to shorten its analysis timeframes so as to address the variability. As demand analysis timeframes decrease to the order of minutes, seconds, or even shorter, the ability to adjust quickly becomes difficult or impossible for monolithic systems or persons to accomplish. The embodiments described herein thus provide a technical improvement to the technical problem of distributing power through a power distribution grid.

FIG. 2 is a simplified block diagram illustrating an example computing environment 200, according to embodiments described herein. The computing environment 200 may be utilized, as described further herein, to calculate adjustments to a power distribution grid.

Referring to FIG. 2, the example computing environment 200 may include a grid planning system 201. In some embodiments, the grid planning system 201 can include at least one data processor 232, one or more memory elements 234, and functionality embodied in one or more components embodied in hardware- and/or software-based logic. For instance, a grid planning system 201 can include a forecast engine 236, a grouping engine 238, a solution engine 239, an adjustment engine 237, and/or a stacked benefit calculator 235, among potentially other components.

Grid model data 240 can be generated for one or more electrical distribution circuits of a power distribution grid using the grid planning system 201. The grid model data 240 may be a model of the power distribution grid (e.g., a circuit and substation model) represented using nodes and edges, as discussed herein with respect to block 310 of FIG. 3. In some embodiments, the grid model data 240 may be updated, for example, as discussed herein with respect to block 420 of FIG. 4B. In some embodiments, the updates to the grid model may be kept as separate updated grid model data 258. In some embodiments, rules for conducting a power flow analysis and/or power flow analysis results may be kept as separate power flow data 259.

Forecast engine 236 may be used to generate forecasted performance of the power distribution grid. In some embodiments, forecast engine 236 may use load forecast data 250, grid model data 240, and/or constraint list data 242 to run load simulations of the power distribution grid (e.g., power flow analysis) and may generate the violation list data 244 based on these simulations. In some embodiments, the violation list data 244 may include a circuit asset constraint violation list. In some embodiments, the constraint list data 242 may include substations and circuit asset constraint list data. In some embodiments, the use load forecast data 250 may include a ten year hourly load forecast. Though illustrated as a single entity, in some embodiments, generating the forecasted performance and running load simulations may be performed by different entities. For example, the power flow analysis may be performed by a separate component. As discussed herein, in block 320 of FIG. 3, the forecast engine 236 may be used to generate the analysis of the power distribution grid. The forecast engine 236 may also determine constraint violations based on this analysis, as discussed herein with respect to block 330 of FIG. 3. In some embodiments, the forecast engine 236 may also be used to verify potential solutions for the power distribution grid, as discussed herein with respect to block 360 of FIGS. 3 and 4B.

Grouping engine 238 may be used to generate violation group list data 246 based on the violation list data 244 and the grid model data 240. The grouping engine may create the constraint violation groups as discussed herein with respect to block 340 of FIG. 3. The grouping engine 238 may generate the violation group list data 246 based on a set of heuristics, such as those included in heuristic data 252 that assess the spatial and temporal locality of individual violations to assess their ability to be grouped.

Solution engine 239 may be used to generate potential solution list data 254 based on solution list data 248 and the violation group list data 246, as discussed herein with respect to block 410 of FIG. 4A. For example, the solution list data 248 may include all possible solutions that may be applied to the power distribution grid. For example, the solution list data 248 may include a solution-to-violation mapping list, as discussed herein. The solution engine 239 may generate the potential solution list data 254 by analyzing the solution list data 248 and applying heuristics and/or machine learning to the violation group list data 246, as discussed herein with respect to blocks 350 and 360 of FIGS. 3 and 4B. In some embodiments, solution engine 239 may also generate scores for the potential solution list data 254 to generate the scored solutions 256 as discussed herein with respect to block 426 of FIG. 4B. In some embodiments, the scored solution data 256 may be generated based on heuristics such as those included within heuristics data 252. In some embodiments, the solution engine 239 may generate one or more solutions for implementation within the power distribution grid based on the scored solution data 256. In some embodiments, as part of generating the scored solution data 256, a set of screened solutions, represented by screened solutions data 257, may be generated.

Stacked benefit calculator 235 may be used to assess whether the potential solutions, such as those represented in the potential solution list data 254 may provide multiple benefits with respect to one or more nodes of the power distribution grid and/or may provide additional benefits to the power distribution grid (such as additional flexibility) beyond the solution to a constraint violation. The stacked benefit calculator 235 may utilize the potential solution list data 254 and/or the grid model data 240 to determine whether a given solution may include multiple impacts and, thus, may receive a higher score (as maintained, for example, in the scored solutions data 256), as discussed herein with respect to block 426 of FIG. 4B. Though illustrated as being co-resident with other elements of the grid planning system 201 (e.g., the forecast engine 236, the solution engine 239, etc.) this is only an example, and the present invention is not limited thereto. In some embodiments, as discussed herein, portions of the grid planning system 201 may perform calculations in a distributed fashion. In some embodiments, the stacked benefits may be computed by a node higher up in a distributed hierarchy of nodes and the results of the stacked benefits analysis may be transmitted from that node to other nodes.

Adjustment engine 237 may be used to implement a selected solution for the power distribution grid. For example, a selected solution may include one or more adjustments to the power distribution grid. The adjustment engine 237 may automatically and autonomously communicate with the power distribution grid to perform the grid adjustments of the solution, as discussed herein with respect to block 370 of FIG. 3. In some embodiments, the adjustment engine 237 may communicate with the power distribution grid via one or more computer networks, such as network 230.

In some embodiments, the grid planning system 201 may generate a synthesized dashboard that may be displayed as a user interface on display 265 of the client device 205. The dashboard may reconcile and aggregate sub-regional planner prioritized solutions/investments for consumption in bulk planning tools. The dashboard may offer specific data streams for hourly, multi-year (e.g., 10 years or more) net load profiles at transmission to distribution bus locations to enable aggregation of system needs. The dashboard may further offer the same time granular data set at the same spatial aggregation for distribution-tied assets that may be technically capable of providing bulk system (transmission and generation fleet) benefits.

In some embodiments, data transfer and storage may be achieved through a central data repository (data hub) residing on a framework utilizing distributed storage and processing. The data hub may be capable of storing large volumes of data to support source data, forecast variations, and investment plans. Applications and planning tools may be enabled to integrate using a variety of connection methods (e.g., application programing interface, database connections). An in-memory distributed computing engine may be utilized for data transfer and aggregation to achieve improved processing times. The framework may utilize distributed processing for large data sets across many servers to achieve massive scalability. For distributed computing, the data and decision making may be done at the lowest possible node with decisions being passed up the hierarchy of devices, cut the present invention is not limited to such a configuration. Thus, though the various elements of the grid planning system 201 are illustrated as being co-resident, the present invention is not limited thereto. In some embodiments, the grid planning system 201 may be implemented in a distributed fashion, with various ones of the elements of the grid planning system 201 executed by one or more computing/communication nodes of a distributed architecture. Each of the distributed computing/communication nodes may calculate/execute/store a portion of the grid planning operation of the grid planning system 201, and may communicate results of the grid planning to other computing/communication nodes for use in additional computation.

A client device 205 may access the grid planning system 201. Client device 205 can include at least one data processor 261, one or more memory elements 263, and functionality embodied in one or more components embodied in hardware- and/or software-based logic. For instance, client device 205 may include display 265 configured to display a graphical user interface which allows control of the operations of the grid planning system 201. For example, in some embodiments, client device 205 may be configured to access the grid planning system 201 to view the scored solution data 256, the grid model data 240, the violation list data 244, or other data generated by the grid planning system 201. In some embodiments, the violation list data 244 and/or violation group list data 246 may be displayed in conjunction with geospatial locations of respective electrical distribution circuits of the power distribution grid so as to indicate the physical location of the violations. In some embodiments, the client device 205 may visibly display the violation list data 244 and/or violation group list data 246 along with the geospatial locations of the respective electrical distribution circuits of the power distribution grid via display 265, but the embodiments described herein are not limited thereto.

In some embodiments, the client device 205 may be in communication with the grid planning system 201 via network 230. Network 230 may include any conventional, public and/or private, real and/or virtual, wired and/or wireless network, including the Internet. Network 230 may also include communication protocols which may be implemented over a power distribution grid, such as the Open Field Message Bus described herein.

In general, "client devices," and "systems," etc. (e.g., 205, 201) in example computing environment 200, can include electronic computing devices operable to receive, transmit, process, store, and/or manage data and information associated with the computing environment 200. As used in this document, the term "computer," "processor," "processor device," or "processing device" is intended to encompass any suitable processing apparatus. For example, elements shown as single devices within the computing environment 200 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, systems and client devices (e.g., 201, 205) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a grid planning system 201, client device 205, and/or other sub-system of computing environment 200 can be at least partially (or wholly) cloud-implemented, web-based, or distributed to remotely host, serve, or otherwise manage data, software services and applications interfacing, coordinating with, dependent on, or used by other services and devices in computing environment 200. In some instances, a server, system, subsystem, or computing device can be implemented as some combination of devices that can be hosted on a common computing system, server, server pool, or cloud computing environment and share computing resources, including shared memory, processors, and interfaces.

In some embodiments, respective ones of the computing elements described herein, such as the forecast engine 236, grouping engine 238, and/or the solution engine 239 may be implemented as distributed agents. In some embodiments, the distributed agents may execute command instructions to implement the embodiments described herein across one, or a plurality, of computing devices. For example, in some embodiments, the solution engine 239 may be implemented within an asset node of the power distribution grid, as discussed herein. The particular node may include computing resources capable of performing a decentralized calculation of a solution associated with portions of the power distribution grid connected to the asset node. The asset node may communicate with other portions of the power distribution grid via network 230, which may include an Open Field Message Bus.

While FIG. 2 is described as containing or being associated with a plurality of elements, not all elements illustrated within computing environment 200 of FIG. 2 may be utilized in each embodiment of the present disclosure. Additionally, one or more of the elements described in connection with the examples of FIG. 2 may be located external to computing environment 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein. In some embodiments, the grid planning system 201 may be distributed, with portions of the operations performed by the grid planning system 201 performed by elements of the power distribution grid.

As discussed herein, aspects of the present disclosure may utilize a graph of a power distribution grid for modeling and decision-making purposes. FIGS. 10 to 13 illustrate example embodiments of the formulation of a power distribution graph, according to embodiments described herein. Performing a power flow analysis of a power distribution grid may include many complex mathematical processes and computations. A power distribution grid may include a large number of (e.g., several thousand) assets. Each asset may have its own characteristics and functionality. Such a level of complexity may prevent the ability for a single person from performing the number of calculations necessary to perform the modeling. In some embodiments, the assets may be modeled mathematically to represent the characteristics of these assets. One mathematical representation of an asset that may be used is referred to as a Yprimitive matrix. Performing a power flow analysis may include the calculation of the voltages at each node of the power distribution grid by solving the following equation:

$$[I] = [Y_{system}][V_{nodes}]$$

Therefore, one of the steps to perform the power flow analysis may include assembling a Ysystem matrix. The Ysystem matrix may represent the whole power distribution grid and may consist of all the Yprimitives of the assets which are assembled together according to the connectivity nodes. A connectivity node is a junction between two assets. Therefore, in some embodiments, the Ysystem consists of connectivity node labels and Yprimitive information.

FIGS. 17A to 17C illustrate schematic elements related to the calculation of Yprimitives, according to some embodiments described herein. FIG. 17A is an example of a resistor with a resistance R, whose terminal voltages are V1 and V2 and injection currents are I1 and I2. The injection currents I1 and I2 may be calculated as:

$$I1 = (V1-V2)/R$$

$$I2 = (V2-V1)/R$$

an R=1/G where R is the resistance/impedance and G is the conductance/admittance. Therefore, the above equation can also be written as:

$$I1 = (V1-V2)G$$

$$I2 = (V2-V1)G$$

Converting this to a matrix form generates:

$$\begin{bmatrix} I1 \\ I2 \end{bmatrix} = \begin{bmatrix} G & -G \\ -G & G \end{bmatrix} \begin{bmatrix} V1 \\ V2 \end{bmatrix}$$

where $$\begin{bmatrix} I1 \\ I2 \end{bmatrix}$$

is the current matrix, $$\begin{bmatrix} V1 \\ V2 \end{bmatrix}$$

is the voltage matrix, and $$\begin{bmatrix} G & -G \\ -G & G \end{bmatrix}$$

is the Yprimitive matrix. The matrix shows the relationship between nodes 1 and 2 as:

$$Y_{primitive} = \begin{bmatrix} Y_{node1node1} & Y_{node1node2} \\ Y_{node2node1} & Y_{node2node2} \end{bmatrix}$$

Thus, each of the elements may be represented with a submatrix. For single phase system, only one element may be in each of the submatrices. In a four-line system (e.g., 3-phase wires and one neutral), each of the submatrices may have 4×4 matrices that denote relationship between the two buses which contains self and mutual admittances.

For example, FIG. 17B illustrates a three-phase system coupling two nodes (Node1 and Node2) via four wires (3 phases and one neutral). In such a system, the matrix may be represented as illustrated in FIG. 17C. For example, in FIG. 17C, an admittance between connection points X and Y may be represented as $Y_{XY}$. For example, a mutual admittance between the connection point of Phase wire-1 at Node1 (labelled as '1' in FIG. 17B) and the connection point of Phase wire-1 at Node2 (labelled as '5' in FIG. 17B) may be represented in FIG. 17C as $Y_{15}$. As another example, a mutual admittance between the connection point of Phase wire-3 at Node1 (labelled as '3' in FIG. 17B) and the connection point of Phase wire-1 at Node1 (labelled as '1' in FIG. 17B) may be represented in FIG. 17C as $Y_{31}$. As another example, a self-admittance between the connection point of Phase wire-1 at Node1 (labelled as '1' in FIG. 17B) and itself may be represented in FIG. 17C as $Y_{11}$. Each of the submatrices diagonal elements of FIG. 17C may represent self-admittances and off-diagonal elements may be mutual admittances.

Figure 10:
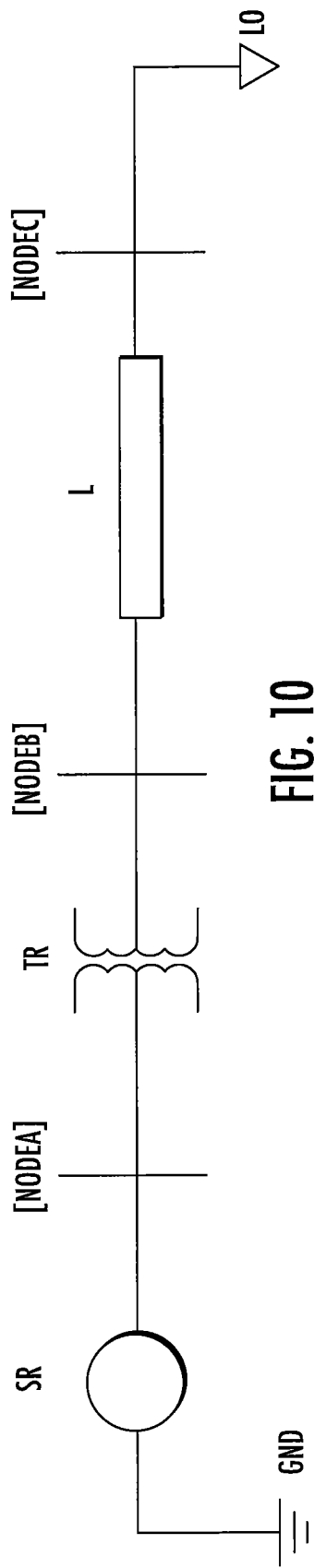

FIG. 10 illustrates an example line diagram for a three-phase simple circuit with four distinct asset elements. FIG. 10 illustrates an example of a circuit containing three assets Sr, Tr, and L coupled between ground and a load Lo (also an asset) by three nodes NodeA, NodeB, NodeC. The assets include a source Sr, a transformer Tr, a Line L, and the Load Lo.

FIGS. 11A to 11D illustrate the respective Yprimitives for the source Sr, the transformer Tr, the Line L, and the Load Lo. Each of the Yprimitives is subdivided into four quadrants A, B, C, D which represent node connectivity. For example, if an element is connected between NodeA and NodeB, which is a transformer in the example of FIG. 10, the Yprimitives will show the relationship between NodeA to NodeA which is self-admittance (quadrant A), NodeA to NodeB (quadrant B) and NodeB to NodeA (quadrant C) which is a transference admittance, and the relationship between NodeB to NodeB which is again a self-admittance (quadrant D). Each of the quadrants represents a 4×4 admittance matrix. The 4×4 matrix represents each of the three phases plus neutral in the power distribution grid.

FIG. 11A illustrates the Yprimitive for the source Sr of FIG. 10, which is connected between NodeA and ground GND. As illustrated in FIG. 11A, quadrant $A_{SR}$ contains the self-admittance for NodeA with respect to the source Sr, quadrant $B_{SR}$ contains the transference admittance for NodeA to ground GND with respect to the source Sr, quadrant $C_{SR}$ contains the transference admittance for ground GND to NodeA with respect to the source Sr, and quadrant $D_{SR}$ contains self-admittance for ground GND with respect to the source Sr.

FIG. 11B illustrates the Yprimitive for the transformer Tr of FIG. 10, which is connected between NodeA and NodeB. As illustrated in FIG. 11B, quadrant $A_{TR}$ contains the self-admittance for NodeA with respect to the transformer Tr, quadrant $B_{TR}$ contains the transference admittance for NodeA to NodeB with respect to the transformer Tr, quadrant $C_{TR}$ contains the transference admittance for NodeB to NodeA with respect to the transformer Tr, and quadrant $D_{TR}$ contains self-admittance for NodeB with respect to the transformer Tr.

FIG. 11C illustrates the Yprimitive for the Line L of FIG. 10, which is connected between NodeB and NodeC. As illustrated in FIG. 11C, quadrant $A_L$ contains the self-admittance for NodeB with respect to the Line L, quadrant $B_L$ contains the transference admittance for NodeB to NodeC with respect to the Line L, quadrant $C_L$ contains the transference admittance for NodeC to NodeB with respect to the Line L, and quadrant $D_L$ contains self-admittance for NodeC with respect to the Line L.

FIG. 11D illustrates the Yprimitive for the Load Lo of FIG. 10, which is connected between NodeC and ground GND. As illustrated in FIG. 11D, quadrant $A_{LO}$ contains the self-admittance for NodeC with respect to the Load Lo, quadrant $B_{LO}$ contains the transference admittance for NodeC to ground GND with respect to the Load Lo, quadrant $C_{LO}$ contains the transference admittance for ground GND to NodeC with respect to the Load Lo, and quadrant $D_{LO}$ contains self-admittance for ground GND with respect to the Load Lo.

For performing the power flow analysis, additional calculations may be used in addition to the Yprimitive matrices. For example, each electrical component of the power distribution grid may be allocated to its corresponding section of the power distribution grid, and the contribution of the particular electrical component to the overall power distribution grid may be described by using a Yallocation. For purposes of the power flow analysis, the circuit topology may be used to determine the two distinct electrical nodes (e.g., segments) to which the electrical element is connected.

Each electrical element's Yprimitive is composed of four Yallocations. The four Yallocations may correspond to the four quadrants of the Yprimitive. For example, the Yprimitive of the transformer Tr can be decomposed into the Yallocations corresponding to quadrants $A_{TR}$, $B_{TR}$, $C_{TR}$, and $D_{TR}$, and the Yprimitive of the Line L can be decomposed into the Yallocations corresponding to quadrants $A_L$, $B_L$, $C_L$, and $D_L$.

This logic may be repeated for each electrical component, and each individual electrical component may produce four Yallocations. Once the Yallocations have been extracted, the Yallocations may be grouped based on their distinct combination of nodes taking into consideration the following schema:

Yallocation=(row_label,col_label,Data(4×4))

Superposition and linear algebra may be used to add up the Yallocations. FIG. 12A illustrates an example of the result of performing the superposition and linear algebra with respect to NodeB×NodeB. This process may be repeated for each of the nodes in combination with other ones of the nodes. FIG. 12B illustrates an example of the result of such a computation on the configuration of FIGS. 10-11D. While assembling Ysystem from Yallocations, all the nodes except ground may be taken into consideration. If two distinct assets have a relationship between common nodes, their corresponding quadrants may be added together, as illustrated in FIG. 12B.

By utilizing the Ysystem configuration, the entire power distribution grid can be mapped in a graph, with relationships between adjacent elements of the power distribution grid represented by data that can be used to generate a power flow analysis. The Ysystem and/or Yprimitive solution described herein is only an example and is not intended to limit the present invention. Other mechanisms for forming the graph of the power distribution grid may be used without deviating from the scope of the invention.

Figure 13:
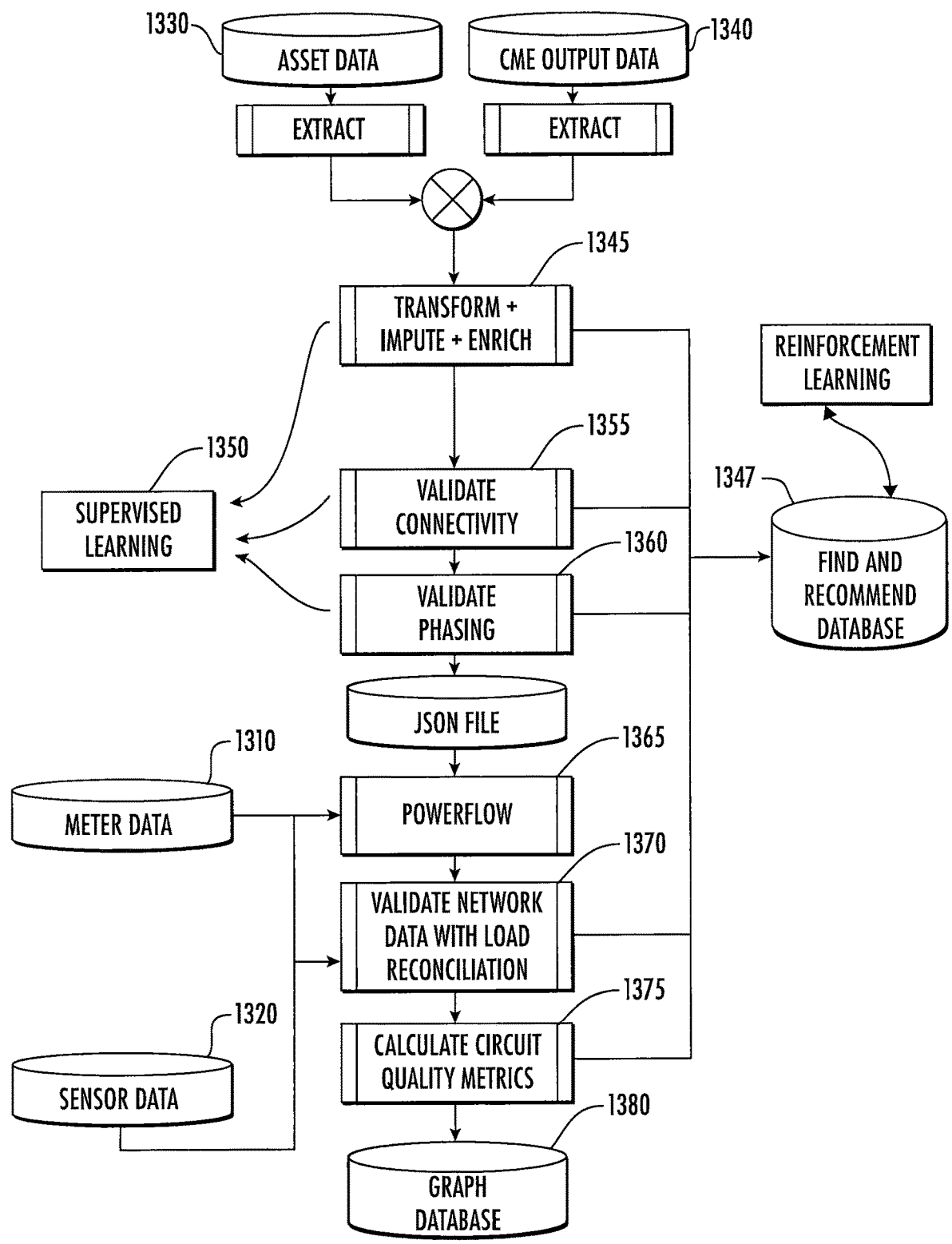

FIG. 13 illustrates a method for creating a graph model of a power distribution grid, according to some embodiments described herein.

The method may include the importation of meter usage data 1310. For example, the meter usage data 1310 may be imported into a time-series friendly database. In some embodiments, the importation may include a one-time, or limited, bulk load for historical data and a rolling daily load for keeping the meter usage data 1310 current. Meter usage data 1310 may be used for power flow analysis as well as load reconciliation-based validation. Meter usage data 1310 may include both automated metering infrastructure (AMI) and automated meter reading (AMR) data.

The method may also include the importation of sensor data 1320 from one or more sensors of the power distribution grid. The sensor data 1320 may include analog and digital measurements, which may include real-time and/or historical data on the state of elements of the power distribution grid. In some embodiments, the sensor data 1320 may include supervisory control and data acquisition (SCADA) data collected for elements of the power distribution grid. The sensor data 1320 may be used for load reconciliation-based validation. In order to limit the number of data points, measurements averaged over the meter interval may be used.

The method may also include extracting asset data 1330 from assets of the power distribution grid. For example, the electrical assets of the power distribution grid and their related tables may be queried to obtain the asset data 1330 used for the power flow analysis. In some embodiments, the asset data 1330 may be queried from a geographic information system (GIS). In order to control the volume of data being fetched, the same set of queries may be executed multiple times using a subset of the circuit IDs for each operation.

The asset data 1330 may include, for example, data related to assets of the power distribution grid. Non-limiting examples of assets that may be included in the asset data 1330 include line sections (conductors), transformers, meters (load), regulators, capacitors, photovoltaics (PV), batteries, reclosers, elbows, fuses, and/or switches.

The asset data 1330 that is extracted may be augmented with data related to the meters and their connectivity information. The meters to transformer connectivity information may be obtained from a customer mapping engine (CME) as CME data 1340. The CME data 1340 may provide accurate meter to transformer connectivity mapping for any given circuit. The CME data 1340 that is imported may also include meter phasing data. The meter phasing data may be used for transformer, laterals, and fuse phasing validation.

In some embodiments, the asset data 1330 and/or the CME data 1340 may be validated for accuracy in value and/or format. For example, if the values are not in the correct format or missing, an Extract, Transform, and Load (ETL) operation 1345 including one or more of transformation, imputation, and/or enrichment may be performed on the data attributes.

Asset data 1330 may include data that is dynamically generated or retrieved from storage. In some embodiments, asset data 1330 may include data from various assets of the power distribution grid, including, for example, data from wires, devices, meters, power generation, DERs, EV placement, etc., and, in some embodiments, the asset data 1330 may include the parent-child relationship for the asset within the power grid (e.g., an immediately adjacent asset that is before or after the asset in the power distribution grid). In some embodiments, the asset data 1330 may include the physical location of the asset.

In some embodiments, the asset data 1330 may include temporal information for the asset. For example, the asset data 1330, may include the current asset layout and information, as well as what will be happening to the power distribution grid in the future, e.g. upgrades to the asset and/or lines associated with the asset. In some embodiments, the asset data 1330 may include work order and scheduling data. For example, the work order and scheduling data may indicate when an asset is being changed and/or when scheduled maintenance will affect (e.g., shut down) the power distribution grid, or a portion of the power distribution grid. This information may allow for better lockout handling and/or avoidance of battery discharges.

In some embodiments, the asset data 1330 may include real-time, operational, and/or planning data. For example, in some embodiments the asset data 1330 may include an area control error (ACE) score. ACE are described, for example, in "Load Frequency Control of Interconnected Power Systems by Considering Self-Component of Area Control Error," by Sahoo et al., National Power Systems Conference, 2004, p966-971. In some embodiments, the asset data 1330 may include GPS data for the asset, which may be retrieved via cellular and/or GPS signaling.

In some embodiments, the asset data 1330 may include weather data, which may be retrieved, for example, from external sources (e.g. NOAA) and/or weather sensors coupled to, or in the proximity of, the asset.

In some embodiments, the asset data 1330 may include jurisdictional information data which can be real time or predicted or defaulted. For example, the jurisdictional data may include a predicted load curve for a given next time period, which may be calculated in seconds and/or longer time periods, such as days/weeks/months. As another example, the jurisdictional data may also include power generation data, such as a generation mix per MW generated, a predicted generation curve for a given next period (e.g., in seconds and/or days/weeks/months, and/or a cost per generation mix. In some embodiments, the jurisdictional data may include $CO_2$ data associated with the node.

In some embodiments, the asset data 1330 may include consumer data pushed to the asset and/or pulled from the asset. In some embodiments, the asset data 1330 may include bi-directional data from consumer loads. For example, the asset data 1330 may indicate to the asset what power loads are coming in the future secs/mins/hrs/days.

The examples of asset data 1330 and/or CME data 1340 provided herein are not limiting of the present invention. More or fewer types of asset data 1330 and/or CME data 1340 may be used without deviating from the scope of the present invention.

A transformation may be performed when the existing field values are not in the required format and may need to be corrected for power flow calculation. Transformation may include converting the value from one unit to another and/or converting the value from one data type to another. For example, if the existing field value for a voltage rating is stored in a formation a text field such as "12.47/7.2 KV," it may be transformed to a number field of the form, for example 12.47.

An imputation may be performed when the existing field values are missing and may need to be filled in using one or more business rules. For example, if the voltage rating field for a regulator is missing, then the missing value may be filled in using a known location, circuit voltage rating, and phasing of the regulator.

An enrichment operation may be performed when a field or value needed for power flow analysis is not available. In an enrichment operation, the field or value may be filled in from external sources such as a planner's database and/or published data on the assets. For example, if a current rating or resistance for a conductor is needed for the asset data 1330, it may be generated based on a stored wire size, material, and/or stranding cross-referenced with external reference tables.

In some embodiments, for each of the above operations, for every field that is transformed, imputed, or enriched, the before and after values may be logged as entries into the find and recommend datastore 1347. The find and recommend datastore 1347 may be used as a storage for rules and/or heuristics for automated learning for the system.

The ETL operation 1345 may leverage supervised learning 1350 to automate the transformation, imputation, and enrichment of the data. As data goes through the ETL pipeline, some data attributes may not be ready to consume for power flow analysis. Attributes not in a preferred form may need to be transformed, imputed, and/or enriched, for example from a string from into some numerical value or vice versa. The numerical and string values (i.e., voltage ratings, configuration types, phasing, etc.) may leverage machine learning to produce the required value for calculation, for example, using Natural Language Processing or some other algorithms.

After the ETL operation 1345, a validation of the connectivity data 1355 may be performed. In this step, the connectivity of all the assets from the circuit head to the meters may be validated to ensure continuous electrical path from the source to the load location. If there are disconnects, the network graph may be mended based on several business rules such as node flipping and/or checking switch status.

Disconnected portions of the network that remain may be logged as finds without recommendations in the find and recommend datastore 1347.

After the validation of the connectivity data 1355, a validation of the phasing data 1360 may be performed. In this step, the circuit model that was validated for connectivity may be checked for phasing errors. This may be done by traversing the network graph and checking for continuity in electrical paths for all the three phases from source to the loads. If there are any disconnects in phase in one or more of the paths, a phasing fix may be performed based on the upstream and downstream phasing. Such assets may be logged as find and recommend entries in the find and recommend datastore 1347.

Next, the meter phasing data from the CME data may be compared against the known phasing for transformers, laterals, and fuses upstream. If the known phases are different from the CME generated meter phases, such assets may be logged as find and recommend issues within the find and recommend datastore 1347. The result of the validation steps may be a circuit model of the power distribution graph.

Next, a power flow analysis 1365 may be performed on the circuit model generated in the previous step by selecting the meter usage data for an hour on a day in the past. The hour and day for power flow analysis may be configurable. In some embodiments, the power flow analysis may be calculated in a distributed fashion. For example, within the power distribution grid, the grid may be categorized into a hierarchy of subset grids, with different computing/communication nodes responsible for performing a power flow analysis on a respective one of the subset grids. Power flow calculations performed at lower levels in the hierarchy may be "passed upstream" to be used in the power flow calculations performed by computing/communication nodes at higher levels in the hierarchy.

The output of the power flow analysis at the circuit head by phases may be compared against the meter usage total and against the sensor measurement data (if available) in a validation operation 1370 that validates the network data. Any differences may be logged. The power flow result may also be reviewed during the validation operation 1370 to identify thermal and voltage violations, if any. If there is significant thermal violation in transformers and/or significant voltage violations in any part of the circuit, the assets in those locations may be further analyzed for any potential data errors. The assets may be logged as find and recommend entries in the find and recommend datastore 1347.

The find and recommend entries from the find and recommend datastore 1347 that were collected over the various validation steps may be used to calculate the circuit quality metrics in validation operation 1370. The quality scores along with find and recommend entries may be saved to a graph database 1380 for future use in fixing and tracking them.

As data is imputed and enriched, the find and recommend datastore 1347 may produce the logs and input necessary to correct data quality problems. With the inspection of a domain expert to validate the recommendation and perform the corrections necessary to the system of record, a Reinforcement Learning approach becomes feasible. The find and recommend datastore 1347 may leverage the produced logs by the ETL pipeline to generate training data and self-learn from user input. This kind of machine learning may recommend to the user, based on prior confirmed actions, the most probable solution to a particular situation.

With the advent of DER at customer and key circuit locations, which can include sensor locations on the circuit for which insights are desired, visibility and control of these locations is becoming an increasing requirement. This may also be used for distributed control of the power distribution grid. One such example is a micro-grid. Micro-grids may be located at the edge of the power distribution grid and may be used to manage energy and support islanded operation of large campuses, individual circuits, and/or substations. Power flow analysis may be useful for control at this level. Other applications for power flow analysis may include safe emergency circuit switching to restore power during system outages and/or simulating current and what-if scenarios for grid operations and grid investment decisions.

Control devices at the edge may be computationally constrained compared to computational devices in a server farm. In some embodiments, computational power may be limited to equivalent of a lower-end processor with a 1-2 GB of RAM. Specially built algorithms with minimal memory and computational requirements may be utilized to perform operations and analysis in these devices. These applications may be built using system level programming languages such as C/C++ or Rust that are compiled into binary code. Such applications may have minimal memory and computational footprint compared to higher level languages such as Python or Java. They also may have predictable performance profiles. A power flow analysis, such as the power flow analysis described herein, built using system language that requires minimum resources and high performance is a good fit for operation on these devices.

In some embodiments, the control device may perform a power flow analysis for a subsection of the power distribution grid. This power flow analysis may be "pushed upstream" to devices within the power distribution grid that may use the power flow analysis of the subsection of the power distribution grid in yet another power flow analysis that incorporates the results for the power grid subsection. In this way, formulation of the power flow analysis of the entire power distribution grid may be distributed across the various control devices in a bottom-up fashion, with control devices providing power flow analyses on those portions of the power distribution grid that are within the realm of operation of the control device.

Figure 14:
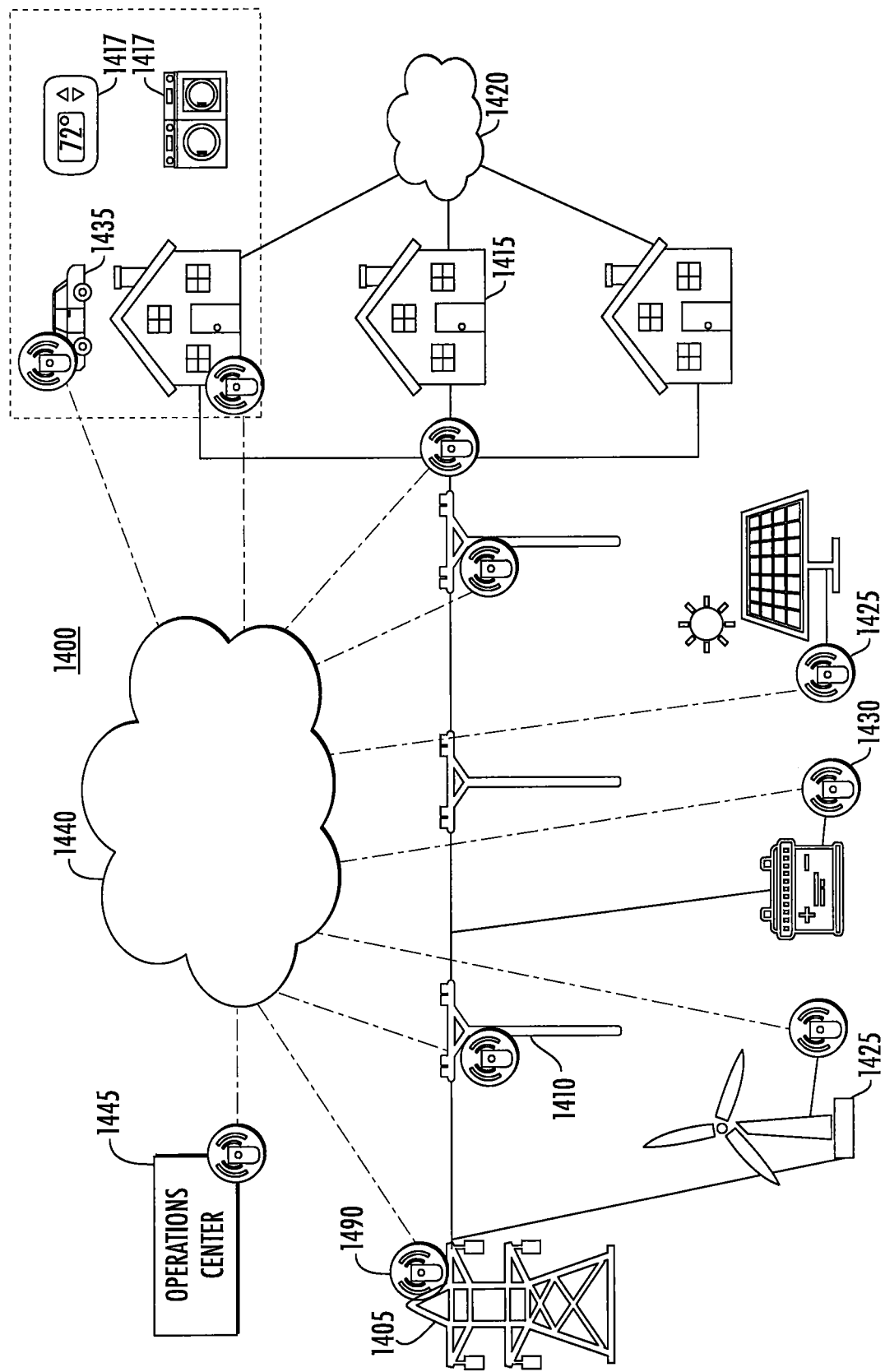
FIG. 14 illustrates a power distribution grid incorporating one or more ANAs according to some embodiments described herein.

An example of such a control device is an agent node appliance (ANA). FIG. 14 illustrates a power distribution grid 1400 incorporating one or more ANAs 1490 according to some embodiments described herein. The power distribution grid 1400 may include one or more power distribution elements 1410 coupled to a power distribution source, such as a transformer, 1405. The power distribution elements 1410 may be electrically coupled such that power generated by the power distribution source 1405 flows to the power distribution elements 1410 and on to other elements of the power distribution grid 1400.

The power may be further distributed from the power distribution elements 1410 over electric circuits to structures 1415, which may be, for example, residential and/or commercial buildings. One or more of the structures 1415 may include dynamic power devices 1417. The dynamic power devices 1417 may be configured to dynamically adjust characteristics of an operation of the dynamic power device 1417 in response to electronically received commands. For example, the dynamic power devices 1417 may include appliances capable of varying characteristics of operation in response to conditions of the power distribution grid 1400 (also known as demand response). For example, the dynamic power device 1417 may be a water heater configured to reduce a temperature of water being heating in response to increased demand on the power distribution grid

1400. As another example, the dynamic power device 1417 may be a programmable thermostat that may dynamically adjust a temperature of the structure 1415 in response to conditions on the power distribution grid 1400. One or more of the structures 1415 may be coupled to an electronic network 1420. Network 1420 may include any conventional, public and/or private, real and/or virtual, wired and/or wireless network, including the Internet.

DG elements 1425 may also be coupled to the power distribution grid 1400. For example, DG elements 1425 may include wind turbines and/or solar installations. The DG elements 1425 may be capable of providing additional power to the power distribution grid 1400 when necessary and/or requested.

ESS elements 1430 may also be coupled to the power distribution grid 1400. ESS elements 1430 include technology that produces power or stores power (e.g., batteries and flywheels). ESS elements 1430 may be dynamically coupled to the power distribution grid 1400 to provide a load and/or a power source to adjust the power load of the power distribution grid 1400 in real time.

The power distribution grid 1400 may also include one or more EVs 1435. The EVs 1435 may include, for example, battery-based vehicle that may be configured to connect at various locations, such as charging points, within the power distribution grid 1400. For example, an EV may be coupled to the power distribution grid 1400 at a structure 1415 when the EV 1435 is plugged in for charging. While the EV 1435 may, in some instances, primarily provide a load (e.g., via charging) at a constant location (such as the house of the owner of the EV), it will be understood that other variations are possible. For example, EVs 1435 may dynamically connect and disconnect from various charging locations distributed throughout the power distribution grid 1400. In some embodiments, where and/or when the connection/disconnections of the EVs 1435 will take place may be difficult to predict.

ANAs 1490 may be distributed throughout the power distribution grid 1400. For example, the ANAs 1490 may be coupled to one or more of the power distribution source 1405, the power distribution elements 1410, the DG elements 1425, the ESS elements 1430, the EV 1435, and/or the structures 1415. With respect to the structures 1415, for example, the ANA 1490 may be coupled at a power meter of the structure 1415 and/or at a distribution point in the power distribution grid 1400 to one or more structures 1415. Other non-limiting examples of where ANAs 1490 may be connect include power poles, segments of the power distribution grid 1400, transformers of the power distribution grid 1400, locations that are communicatively coupled to other elements of the power distribution grid 1400 (e.g., EV charging stations) and the like.

The ANA 1490 may be configured to dynamically connect to a communication network 1440. Communication network 1440 may be, for example, a private network that is different from network 1420. Portions of communication network 1440 may be a wired and/or wireless network. The ANA 1490 may be configured to communicate with other ones of the ANAs 1490 on the communication network 1440 and/or to an operation center 1445 of the power distribution grid 1400.

The ANA 1490 may be configured to be self aware of its location within the power distribution grid 1400. For example, the ANA 1490 may be configured to dynamically determine, for example through queries through the communication network 1440, its hierarchy in the power distribution grid 1400. In some embodiments, the ANA 1490 may be configured to dynamically determine its parent in the power distribution grid 1400 (e.g., the nearest "upstream" ANA 1490 between it and the power distribution source 1405 of the power distribution grid 1400). In some embodiments, the ANA 1490 may be configured to dynamically determine its child in the power distribution grid 1400 (e.g., the nearest "downstream" ANA 1490 of the power distribution grid 1400).

In some embodiments, the ANA 1490 may be configured to have the ability to perform sensing and actuation computations on the power distribution grid 1400. For example, the ANA 1490 may be configured to sense and record power characteristics of the portion of the power distribution grid 1400 to which the ANA 1490 is attached. In some embodiments, the ANA 1490 may be configured to provide data, for example, over communication network 1440 to be utilized for the power flow analysis operations described herein. In some embodiments, the ANA 1490 may be capable of self-configuration operations in which, based on a determined GIS location, the ANA 1490 communicates within the power distribution grid 1400 to determine the node to which the ANA 1490 is connected. In some embodiments, the ANA 1490 may be configured to perform a portion of the power flow analysis operations in a distributed fashion. In some embodiments, the ANA 1490 may be coupled to one or more elements of the power distribution grid 1400 and may be configured to determine one or more characteristics of the one or more elements. For example, as illustrated in FIG. 14, the ANA 1490 may be coupled to the ESS element 1430 and may be capable of communicating with the ESS element 1430 so as to determine characteristics of the ESS element 1430, such as a charge level of the ESS element 1430.

In some embodiments the ANA 1490 may be configured to alter the power distribution grid 1400, such as by connecting or disconnecting an element of the power distribution grid 1400. For example, the ANA 1490 may be configured to coordinate the rerouting of power within the power distribution grid 1400 based on a determined (or reported) health of the power distribution grid 1400. As a non-limiting example, the ANA 1490 may be configured to sample an electricity provided by a DG element 1425 based on the quality of the power provided by the DG element 1425. For example, if a solar photovoltaic DG element 1425 is providing power of poor quality, the photovoltaic DG element 1425 may be disconnected from the power distribution grid 1400 dynamically. As another example, an ANA 1490 coupled to an ESS element 1430, such as a battery, may be configured to selectively connect and/or disconnect the ESS element 1430 to the power distribution grid 1400 responsive to a reported and/or determined state of the power distribution grid 1400. For example, the ANA 1490 may dynamically determine a best time to charge/discharge the ESS element 1430 based on a load profile of the power distribution grid 1400.

In some embodiments, the ANA 1490 may be functionally aware of its role within the power distribution grid 1400. In some embodiments, this role may be programmed into the ANA 1490. In some embodiments, the ANA 1490 may be configured to dynamically determine its role based on analysis of its location and the characteristics of the power distribution grid 1400 to which it is attached. In some embodiments, different functions may be performed on an ANA 1490 based on the contextual setting, such as its location, which may be automatically determined by the ANA 1490. In some embodiments, a state of the power distribution grid 1400 may be altered based on determinations made by the ANA 1490. For example, the ANA 1490 may be configured to change one or more physical components in response to voltage management decisions made by the ANA 1490 and/or communicated to the ANA 1490 over communication network 1440. In some embodiments, the ANA 1490 may be configured to participate in demand response requests to alter an operation of a portion of the power distribution grid 1400 to which the ANA is attached (e.g., by communicating with dynamic power device 1417).

In some embodiments, the configuration of the ANA 1490 may be standard for each of the elements of the power distribution grid 1400. However, the present invention is not limited there to. In some embodiments, respective ones of the ANAs 1490 may incorporate different hardware and/or software configurations depending on a location of the ANA 1490 in the power distribution grid 1400 and/or a type of the element to which the ANA 1490 is coupled. For example, a different type of ANA 1490 may be utilized for a power distribution element 1410 (e.g., a power pole) than for an EV 1435.

In some embodiments, the ANA 1490 may be configured to maintain and/or determine data related to its ambient environment, its customer environment, its geospatial environment, its economic environment, its hierarchy, and its telemetric environment. For example, the data related to the ambient environment may include temperature, humidity, weather, airborne particulates, precipitation, etc. The data related to the customer may include information related to other assets the customer controls, the type of customer (e.g., residential vs. commercial), customer demographics, customer satisfaction, customer outage history, usage data, etc. The data related to geospatial environment may include information related to physical location, altitude, etc. The economic environment data may include billing information, price histories, whether the ANA 1490 is coupled to an asset capable of selling power to the power distribution grid 1400, etc. The hierarchy data may include data that indicates the location of the ANA 1490 in the power distribution grid 1400 relative to other devices. The data related to the telemetric environment may include data related to characteristics of the power being provided to the asset to which the ANA 1490 is attached.

The ANA 1490 may communicate with the communication network 1440 in a number of ways. For example, the ANA 1490 may utilize OFMB. The use of OFMB may enable contained energy orchestration throughout the power distribution grid 1400. In some embodiments, the ANA 1490 may communicate with the communication network 1440 wirelessly, such as via cellular and/or radio communication. Since direct wired connectivity is not required, full energy orchestration may be possible from the customer's meter up to power generation within the power distribution grid 1400. In some embodiments, the communication network 1440, and thus the communication path of the ANA 1490, may be point to point, mesh, and/or through internet protocols, though the present invention is not limited thereto.

The ANA 1490 may utilize an open Application Programming Interface (API) access to communicate to various systems in the power distribution grid 1400. For example, the use of the open API may allow for the ANA 1490 to leverage existing protocol to, for example, communicate with bulk markets to send and receive pricing signals, to utilize protocols such as OpenADR for demand response signals, to utilize American Society of Heating, Refrigeration, and Air Conditioning Engineers (ASHRAE) standards for building interoperability (e.g., for communication to dynamic power devices 1417), and/or to communicate via Open Charge Point Protocol (OCPP) to assets such as EV 1435, etc.

The ANA 1490 may perform a variety of functions that are separated into analysis and operations. The analysis and operation functions may recursively interact with one another. For example, operation of the power distribution grid 1400 may develop particular operational characteristics that may be analyzed, for example, by methods and devices described herein. The analysis may lead to changes (e.g., autonomous changes) in the operation of the power distribution grid 1400. These operational changes may result in new operational characteristics that may be analyzed, which may result in additional operational changes, and so on.

In terms of analysis that may be performed, as supported by the ANA 1490, methods and devices described herein support analysis via power distribution planning, EV forecasting, scheduling for EV charging and/or discharging, load balancing, load aggregation/load disaggregation, voltage management (e.g., via Integrated Volt-VAR Control (IVVC)), forecast models, hosting capacity, power grid optimization, responding to demand response events, etc.

In terms of the operations that may be performed, as supported by the ANA 1490, methods and devices described herein support manipulation of the power distribution grid 1400 by modifying EV operations (e.g., charging pricing, real-time planning, and/or control), altering DER control models, altering Volt/Var control models, administering transactive energy, administering demand response operations (e.g., with respect to dynamic power devices 1417), device actuation, dispatch, power grid diagnostics, fault analysis, and/or integration with customer engagement systems, etc.

To support the power distribution grid 1400, respective ones of the ANAs 1490 may provide distributed data related to the centralized network. For example, the ANA 1490 may communicate circuit data, ambient data, weather information, waterflow/precipitation, power forecast data, and/or meter data. In some embodiments, this data may be compiled/calculated in a distributed fashion and provided in a bottom-up fashion. This approach may both limit the amount of calculations that are required of the centralized network, but may also provide more accurate data, as the data is gathered locally in the power distribution grid 1400 by the ANA 1490.

For example, respective ones of the ANAs 1490 may receive and or detect various types of asset data that are associated with assets of the power distribution grid 1400 to which the ANA 1490 is attached, or is in communication with. Types of asset data that may be collected may include the asset data 1330 discussed herein with respect to FIG. 13.

The ANA 1490 may also be configured to access and/or control sensors of the power distribution grid 1400. In some embodiments, the ANA 1490 may receive real-time, near real-time, and/or historical data. For example, the ANA 1490 may be configured to access power characteristics (e.g., Voltage/KVAR/Phase angle, etc.) for a subset of the power distribution grid 1400 to which the ANA 1490 is connected. In some embodiments, the ANA 1490 may be configured to calculate and/or receive forecast data for the power characteristics (e.g., Voltage/KVAR/Phase angle, etc.) which may be used in power calculations of the ANA 1490. In some embodiments, the ANA 1490 may be configured to dynamically fix missing or inaccurate data or asset information by querying or sensing asset to which the ANA 1490 is physically and/or communicatively connected. In some embodiments, the ANA 1490 may be able to communicate these corrected assets to other portions of the power distribution grid 1400, such as the asset data store of FIG. 13.

In some embodiments, the ANA 1490 may be configured to calculate a portion of the power flow analysis, as discussed herein, for a subset of the power distribution grid 1400. This power flow analysis may be calculated using data points that are provided by other "upstream" devices in the power distribution grid 1400 as well as other "downstream" devices. In some embodiments, a first ANA 1490 may be configured to calculate a power flow analysis for a subset of the power distribution grid 1400, which may be aggregated up to another, second ANA 1490. The first ANA 1490 may perform its power flow analysis based on power flow information that is provided from predecessors and precursors (e.g., "downstream" devices) in the power distribution grid 1400.

The ANA 1490 may also provide a number of capabilities from the perspective of its distributed infrastructure. For example, the ANA 1490 may allow for the coordination and agreement on the physical structure of the power distribution grid 1400 (e.g., Phase A and Phase B of the power network). In some embodiments, the ANAs 1490 may confirm the structure of the power distribution grid 1400 to assist in making the actuations decisions for managing the power distribution grid 1400. In some embodiments, the ANAs 1490 may provide coordination and agreement on the semantic level of the power distribution grid 1400. In some embodiments, the semantic level of the power distribution grid 1400 may be used for constructing the network graph of the power distribution grid 1400 as described herein. In some embodiments, the ANAs 1490 may provide a data related to the physical model of the power distribution grid 1400 that may drive planning decisions. In some embodiments, the ANAs 1490 may be used to inform the network graph of the power distribution grid 1400. The use of the power distribution graph ontology may support standards and interoperability of the power distribution grid 1400.

The use of the ANAs 1490 may also provide transactive benefits in the power distribution grid 1400. For example, the ANAs 1490 may be used for determining a Distribution Location Marginal Price (DLMP) for power grid market opportunities, such as EV transactions. For example, a DLMP for an EV 1435 may be computed at any ANA 1490 in real time because the ANA 1490 may be capable of computing the power flow utilizing devices and methods described herein. Calculating the power flow may be supported by the logic of the power distribution grid 1400 and the power distribution graph described herein. For example, the power distribution grid 1400 may include a set of EV charging stations, each with an ANA 1490. The EV charging stations can communicate between themselves (e.g., via communication network 1440 and/or 1420) to determine a price to charge for energy for the current and future point in time. This determination may be made dynamically based on the distributed control of the ANA 1490 without requiring a top-down analysis or confirmation from a centralized control structure. Such a distributed structure allows for localized decisions to be made without impacting other parts of the power distribution grid 1400.

Figure 15A:
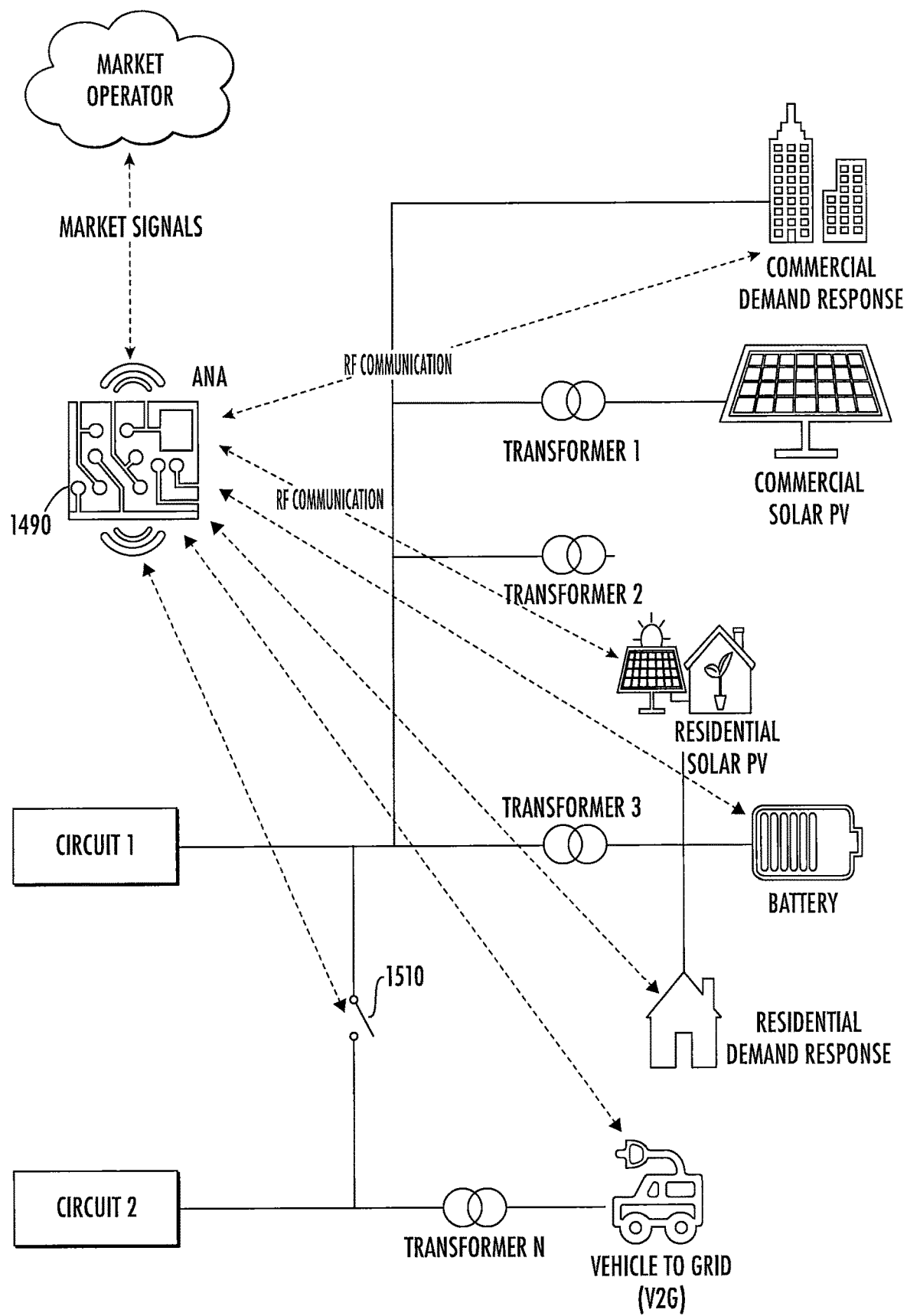
FIGS. 15A to 15C illustrate example embodiments of operations of an ANA within a power distribution grid, according to some embodiments described herein.
Figure 15B:
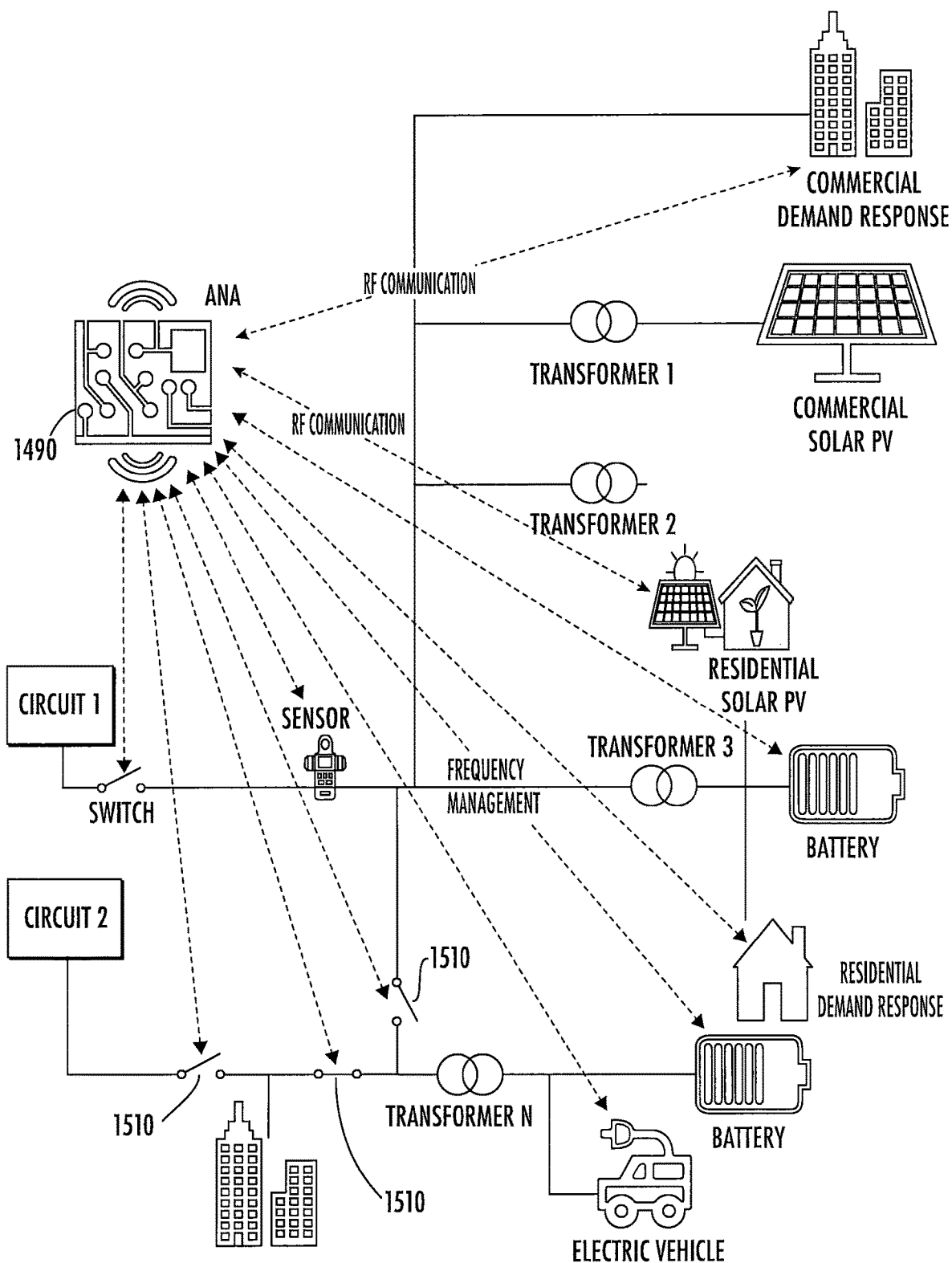
Figure 15C:
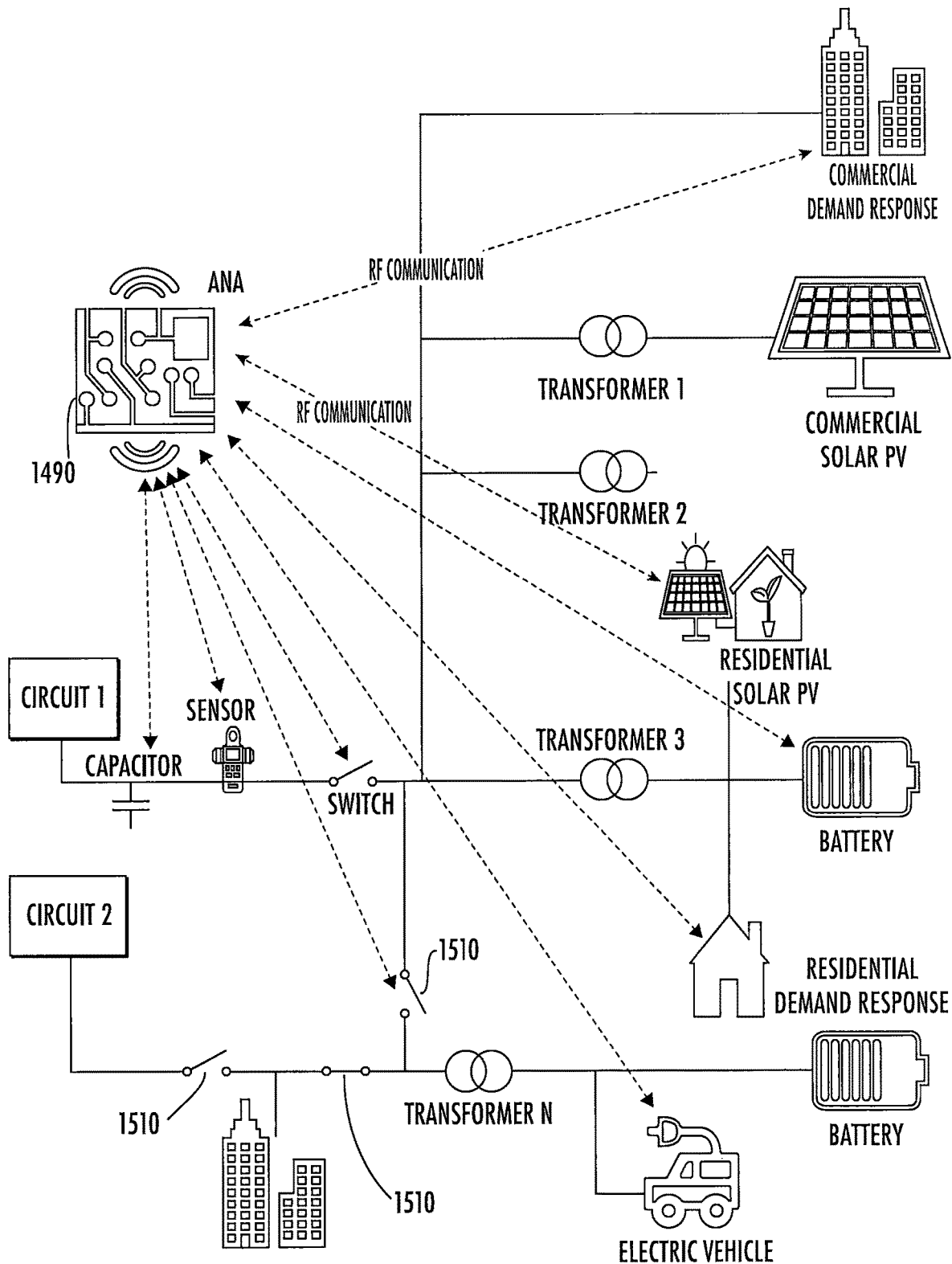

FIGS. 15A to 15C illustrate example embodiments of operations of an ANA within a power distribution grid, according to some embodiments described herein. As discussed herein, the ANA 1490 may provide a number of operational improvements to a power distribution grid 1400. As non-limiting examples, the use of the ANA 1490 may provide benefits in terms of DER management, transactive energy management, micro-grid management, fault location, isolation, and service restoration (FLISR, also referred to as FISR) as a DER management application, and/or local grid monitoring and control.

With respect to DER management, the use of an ANA 1490 may provide the ability to monitor and manage local DER assets within the power distribution grid 1400 to meet specific operational goals. For example, the ANA 1490 may collect measurements from DER devices (e.g., renewables, batteries, demand response devices, etc.) and their respective controllers to monitor their system condition. The ANA 1490 may then coordinate the generation/consumption of power by these resources to meet specific goals or signals. For example, the ANA 1490 may coordinate with the DER device to minimize and/or reduce the load to shave consumption peaks. This may assist, for example, in reducing a peak load, such as from EVs and/or reduce an overloading of a substation by local DER operations. The ANA 1490 may also coordinate with the DER device to flattening the local load profile. For example, the ANA 1490 may coordinate the balancing solar generation with batteries. Operations such as these can address demand spikes and ramps.

The use of the ANA 1490 may also provide improvements with respect to transactive energy management. In some embodiments, transactive energy management may be a form of DER management. FIG. 15A illustrates an example in which the ANA 1490 performs operations associated with transactive energy management. The ANA 1490 may be configured to repeatedly monitor generation from all of the distributed generator (DG) units (e.g., solar photovoltaics, battery, renewables, etc.) and may be configured to monitor demand response potential under the control of the ANA 1490 (which may be a subset of the overall power distribution grid). Based on market conditions, power grid requirements, and/or signals from other elements of the power distribution grid (e.g., other ANAs 1490 and/or the operations center 1445), the ANA 1490 may operate these DER units to meet optimum and/or improved criteria, which may include economic and/or operation criteria). Operations performed and/or coordinated by the ANA 1490 may include, as non-limiting examples, charging/discharging batteries and/or sending events to specific demand response units. As illustrated in FIG. 15A, a given customer and/or power grid element may be connected to multiple circuits within the power distribution grid. The availability of more than one source of power (e.g., Circuit 1 and/or Circuit 2) may allow for the ANA 1490 to select between the two sources for power delivery. In some embodiments, the sources of power (e.g., Circuit 1 and/or Circuit 2) may be configured to be connected/disconnected together via a switch 1510.

The use of the ANA 1490 may also provide improvements with respect to micro-grid management. In some embodiments, a micro-grid is an island-able region (e.g., a subset) of the power distribution grid that can operate off the grid for significant amount of time (e.g., hours and/or days).

In a micro-grid management scenario, ANA 1490 may balance the total load in the micro-grid with the total generation at any given moment and over time. The balancing may include bringing on more generation (e.g. by discharging batteries) or reducing load (e.g. using demand management) to match generation.

The inputs that the ANA 1490 may use for such management may various types of data. For example, the inputs utilized by the ANA 1490 may include the grid model and/or graph for the micro-grid generated as described herein. The inputs may also include data related to short term load and/or a solar generation forecast for the resources within the micro-grid. In some embodiments, the inputs may include demand obtained through sensors and meters (e.g., that are communicatively coupled to the ANA 1490), battery charge levels, and/or generation values from sensors attached to solar elements, discharging battery, and/or other power generators.

Outputs from the ANA 1490 may include control signals sent to resources within the micro-grid. In some embodiments, these signals may be sent in real-time. For example, the ANA 1490 may send demand response/load curtailment signals to managed loads. In some embodiments, the ANA 1490 may generate updated charge/discharge profiles for batteries, which may be communicated to the battery control for their operation. In some embodiments, the ANA may generate an updated generation schedule for other generators (e.g. diesel generators) in the micro-grid.

FIG. 15B illustrates an example in which the ANA 1490 performs operations associated with micro-grid management. Managing a micro-grid by the ANA 1490 may involve monitoring and balancing multiple power generation sources with local load and/or optional power interchange with the power distribution grid. In islanded mode of operation, in addition to generation and load balancing, the ANA 1490 may coordinate other power distribution grid tasks such as frequency control. In addition to communicating with various elements of the power distribution grid, the ANA 1490 may be coupled to other physical elements such as switches 1510 and/or sensors that are coupled to the micro-grid.

For example, in some embodiments, the ANA 1490 may be communicatively coupled to one or more switches 1510. In response to conditions in the power distribution grid and/or results of the power flow analysis described herein, the ANA 1490 may be configured to activate one or more of the switches 1510 to redistribute power distribution within the power distribution grid. For example, the ANA 1490 may be configured to activate one switch 1510 and/or deactivate another switch 1510 so as to switch a power source from a first source (e.g., Circuit 1) to a second source (e.g., Circuit 2).

The use of the ANA 1490 may also provide improvements with respect to the management of FLISR. In some embodiments, the management of FLISR may be performed as a part of DER management of the power distribution grid. FIG. 15C illustrates an example in which the ANA 1490 performs operations associated with FLISR. In some embodiments, the ANA 1490 may manage a local area and/or subset of the power distribution grid in coordination with other similar agents (e.g., other ANAs 1490). In some embodiments, the ANA 1490 may monitor sensors, meters, and/or power flows in a local part of the circuit or substation of the power distribution grid. In some embodiments, the ANA 1490 may control the subset of the power distribution grid based on exceptions or conditions, which may be managed locally by the ANA 1490 and/or received from other portions of the power distribution grid (such as the operations center 1445). Management of the subset of the power distribution grid may be accomplished using actuation resources that may be controlled and/or coordinated by the ANA 1490, such as storage elements (e.g., capacitive elements), sensors, and/or switches 1510. Non-limiting example operations that may be performed by the ANA 1490 (e.g., as a part of FLISR management) may include local Volt/VAR optimization (which may include managing voltage levels and reactive power (VAR) within the local portion of the power distribution grid, localized FLISR and/or other switching operations, peak shaving and load balancing, power distribution control (e.g., via switches 1510), and DER management. In some embodiments, management at the subset level may allow for a faster reaction time without requiring the use of large amounts of computing resources that might be necessary when making decisions at the power distribution grid level. Though FIGS. 15A to 15C do not illustrate explicit communication to each element of the power distribution grid, it will be understood that this is not intended to be limiting of the embodiments described herein. In some embodiments, the ANA 1490 may be able to communicate (e.g., via wired or wireless communication) to various elements within the power distribution grid (e.g., switches 1510, batteries, solar PV, transformers, etc.) whether or not those elements are shown within FIGS. 15A to 15C as being in communication with the ANA 1490.

Figure 16:
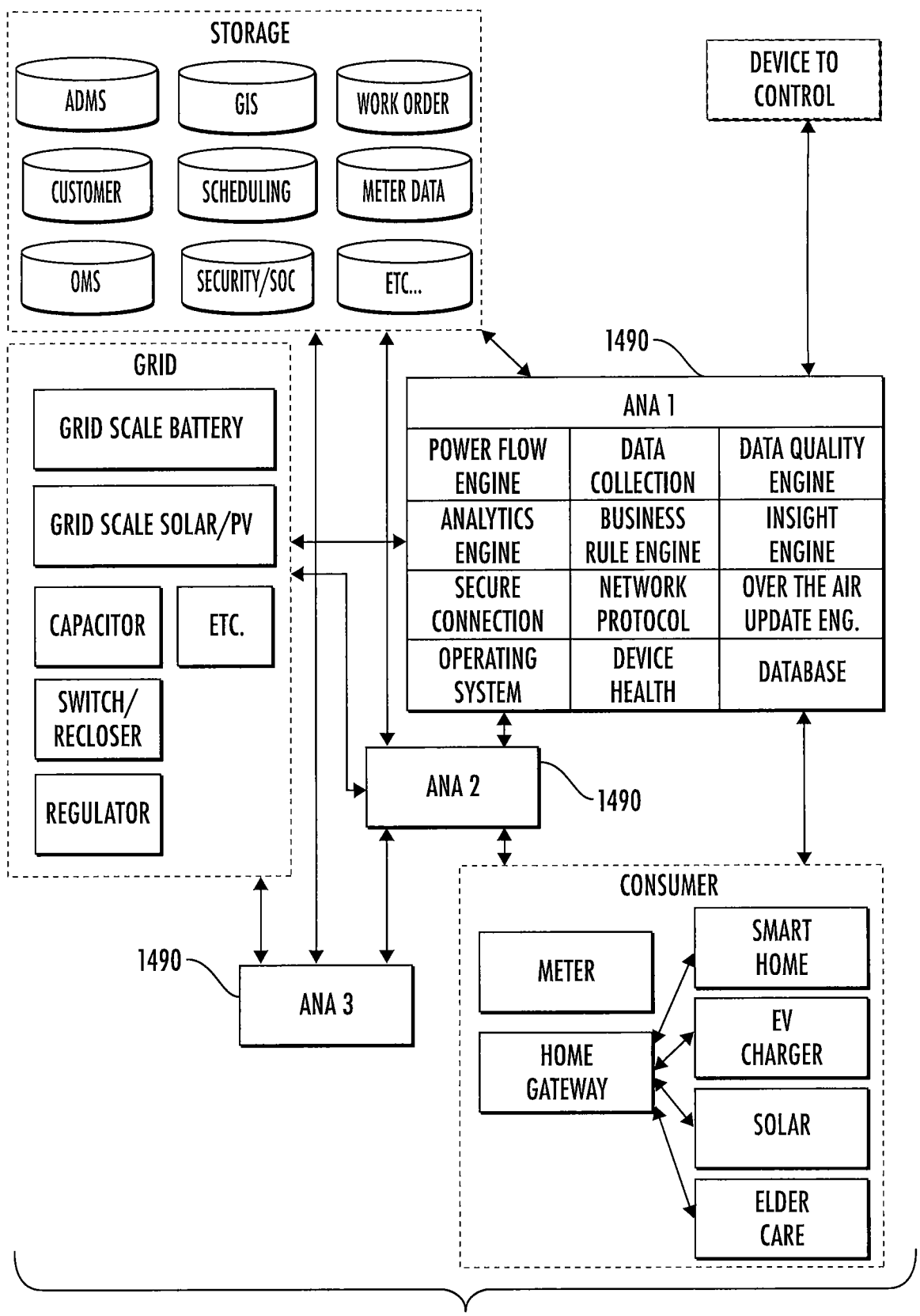
FIG. 16 is a schematic view of example embodiments of operations of an ANA, according to some embodiments described herein.

FIG. 16 is a schematic view of example embodiments of operations of an ANA 1490, according to some embodiments described herein. As illustrated in FIG. 16, one or more ANAs 1490 (illustrated as ANA 1, ANA 2, and ANA 3) may be communicatively coupled in a power distribution grid. Each ANA 1490 may include hardware such as, for example, a processing circuit and volatile and/or non-volatile memory, as well as additional circuitry to perform computing operations (e.g., storage circuitry and/or networking circuitry).

The ANA 1490 may be configured to perform one or more operations to analyze and/or modify the power distribution grid. For example, as described herein, the ANA 1490 may include a power flow engine configured to perform power flow analysis according to embodiments described herein on all, or a portion of, the power distribution grid. The ANA 1490 may also include computer instructions for performing data collection, a data quality engine, an analytics engine, a business rule engine, and/or an insight engine. The data quality engine may include computer instructions for analyzing collected and/or calculated data, and may be configured to verify the data. The analytics engine may be configured to analyze the calculated power flow and/or other power distribution grid metrics to derive one or more modification to the power distribution grid, as described herein. The business rule engine may include information, such as violation definitions and/or other business rules, that may be used as input into any power distribution grid modification. The insight engine may be configured to recognize results and/or other benefits of potential modifications/alterations of the power distribution grid.

The ANA 1490 may include other elements that may assist in its operations. For example, the ANA 1490 may include the capability to form secure connections, such as to communication network 1440. The ANA 1490 may also be configured to communicate via one or more network protocols and may also have the ability to perform self-updates (e.g., over a communication network) so as to update the operations of the ANA 1490 dynamically.

The ANA 1490 may be configured to communicate with a number of elements. For example, the ANA 1490 may be configured to couple to one or more data storage entities. The data storage entities may contain information that the ANA 1490 can use for its operations and/or calculations. For example, the ANA 1490 may be able to communicate (e.g., over communication network 1440) with data related to an advanced distribution management system (ADMS), GIS data, internal work orders, customer data, scheduling data, security and/or security operations center (SOC) data, outage management system (OMS) data, meter data, and the like.

The ANA 1490 may also be coupled to elements of the power distribution grid, such as capacitors, switches and/or reclosers, regulators, batteries, solar/PV elements, and the like. In some embodiments, the ANA 1490 may be configured to communicate with these elements to determine and/or derive performance information on the individual elements.

Similarly, the ANA 1490 may be able to communicate with devices that are connected to the power distribution grid, such as elements of consumers of the power distribution grid. For example, the ANA 1490 may be able to communicate with the consumer's power meter, and or other devices of the consumer (e.g., through a home gateway). For example, the ANA 1490 may be configured to communicate with "smart" elements of the home, such as a programmable thermostat, as well as other electrical devices such as solar equipment, an EV, or an EV charger. In some embodiments, the ANA 1490 may be configured to communicate with these elements through open protocols.

In some embodiments, the ANA 1490 may also be able to control multiple devices on the power distribution grid. For example, as described herein, the ANA 1490 may be configured to control the capacitors, reclosers, switches, etc. of the power distribution grid. For example, the ANA 1490 may be configured to control a switch, such as switch 1510 of FIGS. 15B and 15C, to isolate and/or reconfigure the power distribution grid. The ANA 1490 may also be able to control devices that are connected to the power distribution grid. For example, the ANA 1490 may be able to control smart devices of the consumer, such as the programmable thermostat mentioned previously, as well as other devices such as solar components and/or EV equipment. For example, the ANA 1490 may be able to control the connection of solar equipment of the consumer to the power distribution grid, e.g., in response to the power flow analysis performed by the ANA 1490.

The ANA 1490 may also be configured to communicate with other ANAs 1490 of the power distribution grid. The other ANAs 1490 (e.g., ANA 2, ANA 3) may each be configured similarly and may each be configured to independently analyze the same or different portions of the power distribution grid. In some embodiments, a first ANA 1490 (e.g., ANA 1) may perform analyses on a first subset of the power distribution grid and a second ANA 1490 (e.g., ANA 2) may perform analyses on a second subset, different from the first subset, of the power distribution grid. In some embodiments, the first ANA 1490 and the second ANA 1490 may share information so as to perform portions of their analyses. For example, the first ANA 1490 may use the results of the analysis performed by the second ANA 1490 in order to perform its own analysis.

The use of the ANA 1490 may also provide improvements with respect to local grid management and control. For example, the ANA 1490 may be configured to perform virtual sensing in real-time within the local grid. Virtual sensing may include sensing the electrical parameters (e.g., in real-time) where physical sensors are not available. In some embodiments, the ANA 1490 may be configured to perform load monitoring of transformer and/or other assets of the local grid. The monitoring performed by the ANA 1490 may provide real-time loading information that may allow the ANA 1490 to perform various load management operations. For instance, the ANA 1490 may be configured to adjust regulator and/or capacitor banks when a monitored load is varying beyond acceptable limits. In some embodiments, the ANA 1490 may be configured to provide distributed control (e.g., within a local subset of the power distribution grid, rather than by centralized control of the entire power distribution grid). In some embodiments, the distributed control may include, as a non-limiting example, sophisticated capacitor and regulator controls. For example, the ANA 1490 may be used as a local host which has its own region of operation within the power distribution grid and can control DERs, regulators and capacitor banks within that region. Other ANAs 1490 of the power distribution grid may perform similar operations on other regions of operation within the power distribution grid.

Aspects of the present disclosure describe power distribution planning that is rules-based, utilizing graph-based processing in the form of large scale, distributed, parallel computation using software agents that are given, and define their own, optimization rules using machine learning. The advanced power distribution platform described herein may use intelligent agents, such as ANAs 1490, (parallel rule based) to support automated reasoning, rule deduction, and/or rule induction using various forms of machine learning to solve distribution planning optimization problems. The solutions may be implemented autonomously and may address multiple potential constraint violations with a single solution.

Some embodiments described herein provide a grouping of forecasted power distribution grid violations utilizing a spatial and temporal rules engine to allow for mapping of solutions to violations as one to one, one to many, and/or many to many. Some embodiments described herein provide an integrated layered graphical model of utility ontology, circuits, rules and rule patterns that support agent based reasoning and decision making. Some embodiments described herein provide the use of a statistical model of power flow to determine violations and validate solutions. Some embodiments described herein incorporate a distribution optimization function that includes stacked benefits to determine temporal and spatial value for power distribution, incorporation of esoteric metrics such as reliability, resiliency, environmental impact, public relations, loss minimization, voltage optimization and/or power factor optimization, optimization based on individual requirements of circuit segments and asset classes (e.g., hospital vs residential on same circuit), and/or recognition (i.e. ability to consume) and monetization of system benefits beyond distribution (transmission and generation fleet benefits). Some embodiments described herein provide self-generated rules that emerge from the execution of intelligent agents as they identify new potential solutions to constraint violations. This introduces to the industry self-optimized planning rather than traditional violation based planning.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. Although some of the diagrams include arrows on communication paths to show a primary direction of communication, it is to be understood that communication may occur in the opposite direction to the depicted arrows. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming and/or functional languages, including SAS and/or SQL. The program code may execute entirely on a computing node/circuit, partly on the computing node/circuit, as a stand-alone software package, partly on the computing node/circuit and partly on a remote computer/server or entirely on the remote computer/server. In the latter scenario, the remote computer may be connected to the computing node/circuit through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The terminology used herein is for the purpose of describing particular embodiments only and is not intended to be limiting to other embodiments. As used herein, the singular forms "a," "an," and "the" are intended to include the plural forms as well, unless the context clearly indicates otherwise. It will be further understood that the terms "comprises," "comprising," "includes," and/or "including," "have," and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

When a certain example embodiment may be implemented differently, a specific process order may be performed differently from the described order. For example, two consecutively described processes may be performed substantially at the same time or performed in an order opposite to the described order.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

In the drawings and specification, there have been disclosed typical embodiments and, although specific terms are employed, they are used in a generic and descriptive sense only and not for purposes of limitation, the scope of the disclosure being set forth in the following claims.

Other methods, systems, articles of manufacture, and/or computer program products will be or become apparent to one with skill in the art upon review of the embodiments described herein. It is intended that all such additional systems, methods, articles of manufacture, and/or computer program products be included within the scope of the present disclosure. Moreover, it is intended that all embodiments disclosed herein can be implemented separately or combined in any way and/or combination.

What is claimed is:

1. A control system for a power distribution grid comprising:
    a processor;
    a memory coupled to the processor and comprising computer readable program code that when executed by the processor causes the processor to perform operations comprising:
    constructing a grid model comprising edges and nodes representing assets and transmission paths of the power distribution grid;
    generating an analysis of an operation of the power distribution grid over a predetermined future time period, comprising, utilizing the grid model, generating a simulation of operation and transmission of power throughout the power distribution grid for a predetermined load growth over the future time period;
    determining a plurality of constraint violations based on the analysis of the operation of the power distribution grid within the predetermined time period, wherein each constraint violation is a deviation of operation of an element of the power distribution grid from constraints associated with the element, and wherein each constraint violation comprises a type of violation that is predicted to occur and a predicted time at which the violation will occur;
    generating a plurality of alterations to the power distribution grid, respective ones of the plurality of alterations resolving at least one of the constraint violations;
    selecting a first alteration of the plurality of alterations to the power distribution grid responsive to determining that the selected first alteration resolves at least one of the plurality of constraint violations; and
    autonomously implementing the first alteration to the power distribution grid.

2. The control system of claim 1, wherein autonomously implementing the first alteration to the power distribution grid comprises automatically switching an equipment of the power distribution grid from a first portion of the power distribution grid to a second portion of the power distribution grid.

3. The control system of claim 1, wherein autonomously implementing the first alteration to the power distribution grid comprises transmitting a communication within the power distribution grid to activate at least one of a solar power system, an energy storage system, and a demand response mechanism at a load of the power distribution grid.

4. The control system of claim 3, wherein transmitting the communication comprises transmitting a transmission over an Open Field Message Bus.

5. The control system of claim 3, wherein the demand response mechanism is configured to dynamically throttle the load.

6. The control system of claim 1, wherein generating a plurality of alterations to the power distribution grid is performed by an asset of the power distribution grid.

7. The control system of claim 1, wherein generating the plurality of alterations to the power distribution grid comprises generating the first alteration of the plurality of alterations at a first asset of the power distribution grid and a second alteration of the plurality of alterations at a second asset of the power distribution grid.

8. The control system of claim 1, wherein generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

9. The control system of claim 1, wherein selecting the first alteration of the plurality of alterations to the power distribution grid comprises:
    updating the grid model with the first alteration to form an updated grid model;
    generating a second analysis of a second operation of the updated grid model;
    validating that the first alteration resolves the at least one of the constraint violations based on the second analysis; and
    computing a solution score for the first alteration.

10. The control system of claim 1, wherein selecting the first alteration of the plurality of alterations to the power distribution grid is responsive to determining that the selected first alteration resolves two or more of the plurality of constraint violations.

11. The control system of claim 1, wherein the control system comprises a first agent node appliance in a first subset of the power distribution grid and a second agent node appliance in a second subset of the power distribution grid, and
wherein generating the analysis of the operation of the power distribution grid over the predetermined time period comprises:
the first agent node appliance generating a first analysis of the first subset of the power distribution grid; and
the second agent node appliance generating a second analysis of the second subset of the power distribution grid based on the first analysis.

12. The control system of claim 11, wherein the first agent node appliance is configured to generate the first analysis of the first subset based on sensor data retrieved by the first agent node appliance.

13. The control system of claim 1, wherein generating the plurality of alterations to the power distribution grid comprises altering a discharging cycle of an energy storage system coupled to the power distribution grid.

14. The control system of claim 1, wherein the type of violation comprises a power rating violation for the element and/or a thermal rating violation for the element.

15. A method of operating a power distribution grid comprising:
constructing a grid model comprising edges and nodes representing assets and transmission paths of the power distribution grid;
generating an analysis of an operation of the power distribution grid over a predetermined future time period, comprising, utilizing the grid model, generating a simulation of operation and transmission of power throughout the power distribution grid for a predetermined load growth over the future time period;
determining a plurality of constraint violations based on the analysis of the operation of the power distribution grid within the predetermined time period, wherein each constraint violation is a deviation of operation of an element of the power distribution grid from constraints associated with the element, and wherein each constraint violation comprises a type of violation that is predicted to occur and a predicted time at which the violation will occur;
generating a plurality of alterations to the power distribution grid, respective ones of the plurality of alterations resolving at least one of the constraint violations;
selecting a first alteration of the plurality of alterations to the power distribution grid responsive to determining that the selected first alteration resolves at least two of the plurality of constraint violations; and
autonomously implementing the first alteration to the power distribution grid.

16. The method of claim 15, wherein autonomously implementing the first alteration to the power distribution grid comprises automatically switching an equipment of the power distribution grid from a first portion of the power distribution grid to a second portion of the power distribution grid.

17. The method of claim 15, wherein autonomously implementing the first alteration to the power distribution grid comprises transmitting a communication within the power distribution grid to activate at least one of a solar power system, an energy storage system, and a demand response mechanism at a load of the power distribution grid.

18. The method of claim 17, wherein transmitting the communication comprises transmitting a transmission over an Open Field Message Bus.

19. The method of claim 17, wherein the demand response mechanism is configured to dynamically throttle the load.

20. The method of claim 15, wherein generating a plurality of alterations to the power distribution grid is performed by an asset of the power distribution grid.

21. The method of claim 15, wherein generating the plurality of alterations to the power distribution grid comprises generating the first alteration of the plurality of alterations at a first asset of the power distribution grid and a second alteration of the plurality of alterations at a second asset of the power distribution grid.

22. The method of claim 15, wherein generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

23. The method of claim 15, wherein selecting the first alteration of the plurality of alterations to the power distribution grid comprises:
updating the grid model with the first alteration to form an updated grid model;
generating a second analysis of a second operation of the updated grid model;
validating that the first alteration resolves the at least one of the constraint violations based on the second analysis; and
computing a solution score for the first alteration.

24. The method of claim 15, wherein selecting the first alteration of the plurality of alterations to the power distribution grid is responsive to determining that the selected first alteration resolves two or more of the plurality of constraint violations.

25. The method of claim 15, wherein the type of violation comprises a power rating violation for the element and/or a thermal rating violation for the element.

26. A computer program product comprising:
a tangible non-transitory computer readable storage medium comprising computer readable program code embodied in the computer readable storage medium that when executed by at least one processor causes the at least one processor to perform operations comprising:
constructing a grid model comprising edges and nodes representing assets and transmission paths of a power distribution grid;
generating an analysis of an operation of the power distribution grid over a predetermined future time period, comprising, utilizing the grid model, generating a simulation of operation and transmission of power throughout the power distribution grid for a predetermined load growth over the future time period;
determining a plurality of constraint violations based on the analysis of the operation of the power distribution grid within the predetermined time period, wherein each constraint violation is a deviation of operation of an element of the power distribution grid from constraints associated with the element, and wherein each constraint violation comprises a type of violation that is predicted to occur and a predicted time at which the violation will occur;

generating a plurality of alterations to the power distribution grid, respective ones of the plurality of alterations resolving at least one of the constraint violations;

selecting a first alteration of the plurality of alterations to the power distribution grid responsive to determining that the selected first alteration resolves at least two of the plurality of constraint violations; and autonomously implementing the first alteration to the power distribution grid.

27. The computer program product of claim 26, wherein autonomously implementing the first alteration to the power distribution grid comprises automatically switching an equipment of the power distribution grid from a first portion of the power distribution grid to a second portion of the power distribution grid.

28. The computer program product of claim 26, wherein autonomously implementing the first alteration to the power distribution grid comprises transmitting a communication within the power distribution grid to activate at least one of a solar power system, an energy storage system, and a demand response mechanism at a load of the power distribution grid.

29. The computer program product of claim 28, wherein transmitting the communication comprises transmitting a transmission over an Open Field Message Bus.

30. The computer program product of claim 28, wherein the demand response mechanism is configured to dynamically throttle the load.

31. The computer program product of claim 26, wherein generating a plurality of alterations to the power distribution grid is performed by an asset of the power distribution grid.

32. The computer program product of claim 26, wherein generating the plurality of alterations to the power distribution grid comprises generating the first alteration of the plurality of alterations at a first asset of the power distribution grid and a second alteration of the plurality of alterations at a second asset of the power distribution grid.

33. The computer program product of claim 26, wherein generating the plurality of alterations to the power distribution grid comprises generating a list of potential alterations and then scoring the list of potential alterations based on, for each respective alteration, a time to implement the respective alteration, a cost of the respective alteration, reliability of the respective alteration, resiliency of the respective alteration, an environmental impact of the respective alteration, a power factor optimization of the respective alteration, a loss minimization of the respective alteration, a market opportunity of the respective alteration, and/or a public relations impact of the respective alteration.

34. The computer program product of claim 26, wherein selecting the first alteration of the plurality of alterations to the power distribution grid comprises:

updating the grid model with the first alteration to form an updated grid model;

generating a second analysis of a second operation of the updated grid model;

validating that the first alteration resolves the at least one of the constraint violations based on the second analysis; and computing a solution score for the first alteration.

35. The computer program product of claim 26, wherein selecting the first alteration of the plurality of alterations to the power distribution grid is responsive to determining that the selected first alteration resolves two or more of the plurality of constraint violations.

36. The computer program product of claim 26, wherein the type of violation comprises a power rating violation for the element and/or a thermal rating violation for the element.

* * * * *